United States Patent
Shaquer et al.

(12) 
(10) Patent No.: US 11,102,594 B2
(45) Date of Patent: Aug. 24, 2021

(54) CONTACT HEARING SYSTEMS, APPARATUS AND METHODS

(71) Applicant: Earlens Corporation, Menlo Park, CA (US)

(72) Inventors: Cem Shaquer, Saratoga, CA (US); Louis Wong, Los Altos Hills, CA (US); Kulbir Sandhu, Fremont, CA (US); Mudhafar Hassan Ali, Menlo Park, CA (US); Thanh Tran, Houston, TX (US)

(73) Assignee: Earlens Corporation, Menlo Park, CA (US)

( * ) Notice: Subject to any disclaimer, the term of this patent is extended or adjusted under 35 U.S.C. 154(b) by 0 days.

(21) Appl. No.: 16/895,279

(22) Filed: Jun. 8, 2020

(65) Prior Publication Data

US 2020/0304927 A1    Sep. 24, 2020

Related U.S. Application Data

(63) Continuation of application No. 15/695,566, filed on Sep. 5, 2017, now abandoned.

(Continued)

(51) Int. Cl.
*H04R 25/00* (2006.01)
*H04B 5/00* (2006.01)

(52) U.S. Cl.
CPC ......... *H04R 25/604* (2013.01); *H04B 5/0031* (2013.01); *H04B 5/0037* (2013.01);
(Continued)

(58) Field of Classification Search
CPC combination set(s) only.
See application file for complete search history.

(56) References Cited

U.S. PATENT DOCUMENTS 2,763,334 A    9/1956 Starkey
3,209,082 A    9/1965 McCarrell et al.
(Continued)

FOREIGN PATENT DOCUMENTS

AU    2004301961 A1    2/2005
CA    2242545 C    9/2009
(Continued)

OTHER PUBLICATIONS

Knight, D. Diode detectors for RF measurement. Paper. Jan. 1, 2016. [Retrieved from 1-16 online] (retrieved Feb. 11, 2020) abstract, p. 1; section 1, p. 6; section 1.3, p. 9; section 3 voltage-double rectifier, p. 21; section 5, p. 27. URL: g3ynh.info/circuits/Diode_det.pdf.

(Continued)

*Primary Examiner* — Fan S Tsang
*Assistant Examiner* — Angelica M McKinney
(74) *Attorney, Agent, or Firm* — Wilson Sonsini Goodrich & Rosati, P.C.

(57) ABSTRACT

The present invention is directed to a hearing aid which includes a lateral ear canal assembly and a medial ear canal assembly. In embodiments of the invention the medial ear canal assembly may include smart circuitry adapted to control parameters and outputs of the medial ear canal assembly. In embodiments of the invention various methods and circuitry are described, wherein the methods and circuitry are adapted to improve the performance and efficiency of the hearing aid.

24 Claims, 9 Drawing Sheets

Related U.S. Application Data

(60) Provisional application No. 62/385,914, filed on Sep. 9, 2016.

(52) U.S. Cl.
CPC ......... *H04R 25/305* (2013.01); *H04R 25/552* (2013.01); *H04R 25/554* (2013.01); *H04R 25/558* (2013.01); *H04R 25/656* (2013.01); *H04R 2225/023* (2013.01); *H04R 2225/31* (2013.01); *H04R 2460/15* (2013.01)

(56) References Cited

U.S. PATENT DOCUMENTS

| | | |
|---|---|---|
| 3,229,049 A | 1/1966 | Goldberg |
| 3,440,314 A | 4/1969 | Frisch |
| 3,449,768 A | 6/1969 | Doyle et al. |
| 3,526,949 A | 9/1970 | Genovese |
| 3,549,818 A | 12/1970 | Turner |
| 3,585,416 A | 6/1971 | Mellen |
| 3,594,514 A | 7/1971 | Wingrove |
| 3,710,399 A | 1/1973 | Hurst |
| 3,712,962 A | 1/1973 | Epley |
| 3,764,748 A | 10/1973 | Branch et al. |
| 3,808,179 A | 4/1974 | Gaylord |
| 3,870,832 A | 3/1975 | Fredrickson |
| 3,882,285 A | 5/1975 | Nunley et al. |
| 3,965,430 A | 6/1976 | Brandt |
| 3,985,977 A | 10/1976 | Beaty et al. |
| 4,002,897 A | 1/1977 | Kleinman et al. |
| 4,031,318 A | 6/1977 | Pitre |
| 4,061,972 A | 12/1977 | Burgess |
| 4,075,042 A | 2/1978 | Das |
| 4,098,277 A | 7/1978 | Mendell |
| 4,109,116 A | 8/1978 | Victoreen |
| 4,120,570 A | 10/1978 | Gaylord |
| 4,207,441 A | 6/1980 | Ricard et al. |
| 4,248,899 A | 2/1981 | Lyon et al. |
| 4,252,440 A | 2/1981 | Fedors et al. |
| 4,281,419 A | 8/1981 | Treace |
| 4,303,772 A | 12/1981 | Novicky |
| 4,319,359 A | 3/1982 | Wolf |
| 4,334,315 A | 6/1982 | Ono et al. |
| 4,334,321 A | 6/1982 | Edelman |
| 4,338,929 A | 7/1982 | Lundin et al. |
| 4,339,954 A | 7/1982 | Anson et al. |
| 4,357,497 A | 11/1982 | Hochmair et al. |
| 4,375,016 A | 2/1983 | Harada |
| 4,380,689 A | 4/1983 | Giannetti |
| 4,428,377 A | 1/1984 | Zollner et al. |
| 4,524,294 A | 6/1985 | Brody |
| 4,540,761 A | 9/1985 | Kawamura et al. |
| 4,556,122 A | 12/1985 | Goode |
| 4,592,087 A | 5/1986 | Killion |
| 4,606,329 A | 8/1986 | Hough |
| 4,611,598 A | 9/1986 | Hortmann et al. |
| 4,628,907 A | 12/1986 | Epley |
| 4,641,377 A | 2/1987 | Rush et al. |
| 4,652,414 A | 3/1987 | Schlaegel |
| 4,654,554 A | 3/1987 | Kishi |
| 4,689,819 A | 8/1987 | Killion |
| 4,696,287 A | 9/1987 | Hortmann et al. |
| 4,729,366 A | 3/1988 | Schaefer |
| 4,741,339 A | 5/1988 | Harrison et al. |
| 4,742,499 A | 5/1988 | Butler |
| 4,756,312 A | 7/1988 | Epley |
| 4,759,070 A | 7/1988 | Voroba et al. |
| 4,766,607 A | 8/1988 | Feldman |
| 4,774,933 A | 10/1988 | Hough et al. |
| 4,776,322 A | 10/1988 | Hough et al. |
| 4,782,818 A | 11/1988 | Mori |
| 4,800,884 A | 1/1989 | Heide et al. |
| 4,800,982 A | 1/1989 | Carlson |
| 4,817,607 A | 4/1989 | Tatge |
| 4,840,178 A | 6/1989 | Heide et al. |
| 4,845,755 A | 7/1989 | Busch et al. |
| 4,865,035 A | 9/1989 | Mori |
| 4,870,688 A | 9/1989 | Voroba et al. |
| 4,918,745 A | 4/1990 | Hutchison |
| 4,932,405 A | 6/1990 | Peeters et al. |
| 4,936,305 A | 6/1990 | Ashtiani et al. |
| 4,944,301 A | 7/1990 | Widin et al. |
| 4,948,855 A | 8/1990 | Novicky |
| 4,957,478 A | 9/1990 | Maniglia et al. |
| 4,963,963 A | 10/1990 | Dorman |
| 4,982,434 A | 1/1991 | Lenhardt et al. |
| 4,999,819 A | 3/1991 | Newnham et al. |
| 5,003,608 A | 3/1991 | Carlson |
| 5,012,520 A | 4/1991 | Steeger |
| 5,015,224 A | 5/1991 | Maniglia |
| 5,015,225 A | 5/1991 | Hough et al. |
| 5,031,219 A | 7/1991 | Ward et al. |
| 5,061,282 A | 10/1991 | Jacobs |
| 5,066,091 A | 11/1991 | Stoy et al. |
| 5,068,902 A | 11/1991 | Ward |
| 5,094,108 A | 3/1992 | Kim et al. |
| 5,117,461 A | 5/1992 | Moseley |
| 5,142,186 A | 8/1992 | Cross et al. |
| 5,163,957 A | 11/1992 | Sade et al. |
| 5,167,235 A | 12/1992 | Seacord et al. |
| 5,201,007 A | 4/1993 | Ward et al. |
| 5,220,612 A | 6/1993 | Tibbetts et al. |
| 5,259,032 A | 11/1993 | Perkins et al. |
| 5,272,757 A | 12/1993 | Scofield et al. |
| 5,276,910 A | 1/1994 | Buchele |
| 5,277,694 A | 1/1994 | Leysieffer et al. |
| 5,282,858 A | 2/1994 | Bisch et al. |
| 5,296,797 A | 3/1994 | Bartlett |
| 5,298,692 A | 3/1994 | Ikeda et al. |
| 5,338,287 A | 8/1994 | Miller et al. |
| 5,360,388 A | 11/1994 | Spindel et al. |
| 5,378,933 A | 1/1995 | Pfannenmueller et al. |
| 5,402,496 A | 3/1995 | Soli et al. |
| 5,411,467 A | 5/1995 | Hortmann et al. |
| 5,424,698 A | 6/1995 | Dydyk et al. |
| 5,425,104 A | 6/1995 | Shennib et al. |
| 5,440,082 A | 8/1995 | Claes |
| 5,440,237 A | 8/1995 | Brown et al. |
| 5,455,994 A | 10/1995 | Termeer et al. |
| 5,456,654 A | 10/1995 | Ball |
| 5,531,787 A | 7/1996 | Lesinski et al. |
| 5,531,954 A | 7/1996 | Heide et al. |
| 5,535,282 A | 7/1996 | Luca |
| 5,554,096 A | 9/1996 | Ball |
| 5,558,618 A | 9/1996 | Maniglia |
| 5,571,148 A | 11/1996 | Loeb et al. |
| 5,572,594 A | 11/1996 | Devoe et al. |
| 5,606,621 A | 2/1997 | Reiter et al. |
| 5,624,376 A | 4/1997 | Ball et al. |
| 5,654,530 A | 8/1997 | Sauer et al. |
| 5,692,059 A | 11/1997 | Kruger |
| 5,699,809 A | 12/1997 | Combs et al. |
| 5,701,348 A | 12/1997 | Shennib et al. |
| 5,707,338 A | 1/1998 | Adams et al. |
| 5,715,321 A | 2/1998 | Andrea et al. |
| 5,721,783 A | 2/1998 | Anderson |
| 5,722,411 A | 3/1998 | Suzuki et al. |
| 5,729,077 A | 3/1998 | Newnham et al. |
| 5,740,258 A | 4/1998 | Goodwin-Johansson |
| 5,742,692 A | 4/1998 | Garcia et al. |
| 5,749,912 A | 5/1998 | Zhang et al. |
| 5,762,583 A | 6/1998 | Adams et al. |
| 5,772,575 A | 6/1998 | Lesinski et al. |
| 5,774,259 A | 6/1998 | Saitoh et al. |
| 5,782,744 A | 7/1998 | Money |
| 5,788,711 A | 8/1998 | Lehner et al. |
| 5,795,287 A | 8/1998 | Ball et al. |
| 5,797,834 A | 8/1998 | Goode |
| 5,800,336 A | 9/1998 | Ball et al. |
| 5,804,109 A | 9/1998 | Perkins |
| 5,804,907 A | 9/1998 | Park et al. |
| 5,814,095 A | 9/1998 | Mueller et al. |
| 5,824,022 A | 10/1998 | Zilberman et al. |
| 5,825,122 A | 10/1998 | Givargizov et al. |

(56) References Cited

U.S. PATENT DOCUMENTS

| | | |
|---|---|---|
| 5,836,863 A | 11/1998 | Bushek et al. |
| 5,842,967 A | 12/1998 | Kroll |
| 5,851,199 A | 12/1998 | Peerless et al. |
| 5,857,958 A | 1/1999 | Ball et al. |
| 5,859,916 A | 1/1999 | Ball et al. |
| 5,868,682 A | 2/1999 | Combs et al. |
| 5,879,283 A | 3/1999 | Adams et al. |
| 5,888,187 A | 3/1999 | Jaeger et al. |
| 5,897,486 A | 4/1999 | Ball et al. |
| 5,899,847 A | 5/1999 | Adams et al. |
| 5,900,274 A | 5/1999 | Chatterjee et al. |
| 5,906,635 A | 5/1999 | Maniglia |
| 5,913,815 A | 6/1999 | Ball et al. |
| 5,922,017 A | 7/1999 | Bredberg et al. |
| 5,922,077 A | 7/1999 | Espy et al. |
| 5,935,170 A | 8/1999 | Haakansson et al. |
| 5,940,519 A | 8/1999 | Kuo |
| 5,949,895 A | 9/1999 | Ball et al. |
| 5,951,601 A | 9/1999 | Lesinski et al. |
| 5,984,859 A | 11/1999 | Lesinski |
| 5,987,146 A | 11/1999 | Pluvinage et al. |
| 6,001,129 A | 12/1999 | Bushek et al. |
| 6,005,955 A | 12/1999 | Kroll et al. |
| 6,011,984 A | 1/2000 | Van Antwerp et al. |
| 6,024,717 A | 2/2000 | Ball et al. |
| 6,038,480 A | 3/2000 | Hrdlicka et al. |
| 6,045,528 A | 4/2000 | Arenberg et al. |
| 6,050,933 A | 4/2000 | Bushek et al. |
| 6,067,474 A * | 5/2000 | Schulman ......... H01M 10/0436 607/57 |
| 6,068,589 A | 5/2000 | Neukermans |
| 6,068,590 A | 5/2000 | Brisken |
| 6,072,884 A | 6/2000 | Kates |
| 6,084,975 A | 7/2000 | Perkins |
| 6,093,144 A | 7/2000 | Jaeger et al. |
| 6,135,612 A | 10/2000 | Clore |
| 6,137,889 A | 10/2000 | Shennib et al. |
| 6,139,488 A | 10/2000 | Ball |
| 6,153,966 A | 11/2000 | Neukermans |
| 6,168,948 B1 | 1/2001 | Anderson et al. |
| 6,174,278 B1 | 1/2001 | Jaeger et al. |
| 6,175,637 B1 | 1/2001 | Fujihira et al. |
| 6,181,801 B1 | 1/2001 | Puthuff et al. |
| 6,190,305 B1 | 2/2001 | Ball et al. |
| 6,190,306 B1 | 2/2001 | Kennedy |
| 6,208,445 B1 | 3/2001 | Reime |
| 6,216,040 B1 | 4/2001 | Harrison |
| 6,217,508 B1 | 4/2001 | Ball et al. |
| 6,219,427 B1 | 4/2001 | Kates et al. |
| 6,222,302 B1 | 4/2001 | Imada et al. |
| 6,222,927 B1 | 4/2001 | Feng et al. |
| 6,240,192 B1 | 5/2001 | Brennan et al. |
| 6,241,767 B1 | 6/2001 | Stennert et al. |
| 6,259,951 B1 | 7/2001 | Kuzma et al. |
| 6,261,224 B1 | 7/2001 | Adams et al. |
| 6,264,603 B1 | 7/2001 | Kennedy |
| 6,277,148 B1 | 8/2001 | Dormer |
| 6,312,959 B1 | 11/2001 | Datskos |
| 6,339,648 B1 | 1/2002 | McIntosh et al. |
| 6,342,035 B1 | 1/2002 | Kroll et al. |
| 6,354,990 B1 | 3/2002 | Juneau et al. |
| 6,359,993 B2 | 3/2002 | Brimhall |
| 6,366,863 B1 | 4/2002 | Bye et al. |
| 6,374,143 B1 | 4/2002 | Berrang et al. |
| 6,385,363 B1 | 5/2002 | Rajic et al. |
| 6,387,039 B1 | 5/2002 | Moses |
| 6,390,971 B1 | 5/2002 | Adams et al. |
| 6,393,130 B1 | 5/2002 | Stonikas et al. |
| 6,422,991 B1 | 7/2002 | Jaeger |
| 6,432,248 B1 | 8/2002 | Popp et al. |
| 6,434,246 B1 | 8/2002 | Kates et al. |
| 6,434,247 B1 | 8/2002 | Kates et al. |
| 6,436,028 B1 | 8/2002 | Dormer |
| 6,438,244 B1 | 8/2002 | Juneau et al. |
| 6,445,799 B1 | 9/2002 | Taenzer et al. |
| 6,473,512 B1 | 10/2002 | Juneau et al. |
| 6,475,134 B1 | 11/2002 | Ball et al. |
| 6,491,622 B1 | 12/2002 | Kasic, II et al. |
| 6,491,644 B1 | 12/2002 | Vujanic et al. |
| 6,491,722 B1 | 12/2002 | Kroll et al. |
| 6,493,453 B1 | 12/2002 | Glendon |
| 6,493,454 B1 | 12/2002 | Loi et al. |
| 6,498,858 B2 | 12/2002 | Kates |
| 6,507,758 B1 | 1/2003 | Greenberg et al. |
| 6,519,376 B2 | 2/2003 | Biagi et al. |
| 6,523,985 B2 | 2/2003 | Hamanaka et al. |
| 6,536,530 B2 | 3/2003 | Schultz et al. |
| 6,537,200 B2 | 3/2003 | Leysieffer et al. |
| 6,547,715 B1 | 4/2003 | Mueller et al. |
| 6,549,633 B1 | 4/2003 | Westermann |
| 6,549,635 B1 | 4/2003 | Gebert |
| 6,554,761 B1 | 4/2003 | Puria et al. |
| 6,575,894 B2 | 6/2003 | Leysieffer et al. |
| 6,592,513 B1 | 7/2003 | Kroll et al. |
| 6,603,860 B1 | 8/2003 | Taenzer et al. |
| 6,620,110 B2 | 9/2003 | Schmid |
| 6,626,822 B1 | 9/2003 | Jaeger et al. |
| 6,629,922 B1 | 10/2003 | Puria et al. |
| 6,631,196 B1 | 10/2003 | Taenzer et al. |
| 6,643,378 B2 | 11/2003 | Schumaier |
| 6,663,575 B2 | 12/2003 | Leysieffer |
| 6,668,062 B1 | 12/2003 | Luo et al. |
| 6,676,592 B2 | 1/2004 | Ball et al. |
| 6,681,022 B1 | 1/2004 | Puthuff et al. |
| 6,695,943 B2 | 2/2004 | Juneau et al. |
| 6,697,674 B2 | 2/2004 | Leysieffer |
| 6,724,902 B1 | 4/2004 | Shennib et al. |
| 6,726,618 B2 | 4/2004 | Miller |
| 6,726,718 B1 | 4/2004 | Carlyle et al. |
| 6,727,789 B2 | 4/2004 | Tibbetts et al. |
| 6,728,024 B2 | 4/2004 | Ribak |
| 6,735,318 B2 | 5/2004 | Cho |
| 6,754,358 B1 | 6/2004 | Boesen et al. |
| 6,754,359 B1 | 6/2004 | Svean et al. |
| 6,754,537 B1 | 6/2004 | Harrison et al. |
| 6,785,394 B1 | 8/2004 | Olsen et al. |
| 6,792,114 B1 | 9/2004 | Kates et al. |
| 6,801,629 B2 | 10/2004 | Brimhall et al. |
| 6,829,363 B2 | 12/2004 | Sacha |
| 6,831,986 B2 | 12/2004 | Kates |
| 6,837,857 B2 | 1/2005 | Stirnemann |
| 6,842,647 B1 | 1/2005 | Griffith et al. |
| 6,888,949 B1 | 5/2005 | Vanden et al. |
| 6,900,926 B2 | 5/2005 | Ribak |
| 6,912,289 B2 | 6/2005 | Vonlanthen et al. |
| 6,920,340 B2 | 7/2005 | Laderman |
| 6,931,231 B1 | 8/2005 | Griffin |
| 6,940,988 B1 | 9/2005 | Shennib et al. |
| 6,940,989 B1 | 9/2005 | Shennib et al. |
| D512,979 S | 12/2005 | Corcoran et al. |
| 6,975,402 B2 | 12/2005 | Bisson et al. |
| 6,978,159 B2 | 12/2005 | Feng et al. |
| 7,020,297 B2 | 3/2006 | Fang et al. |
| 7,024,010 B2 | 4/2006 | Saunders et al. |
| 7,043,037 B2 | 5/2006 | Lichtblau et al. |
| 7,050,675 B2 | 5/2006 | Zhou et al. |
| 7,050,876 B1 | 5/2006 | Fu et al. |
| 7,057,256 B2 | 6/2006 | Mazur et al. |
| 7,058,182 B2 | 6/2006 | Kates |
| 7,058,188 B1 | 6/2006 | Allred |
| 7,072,475 B1 | 7/2006 | Denap et al. |
| 7,076,076 B2 | 7/2006 | Bauman |
| 7,095,981 B1 | 8/2006 | Voroba et al. |
| 7,167,572 B1 | 1/2007 | Harrison et al. |
| 7,174,026 B2 | 2/2007 | Niederdrank et al. |
| 7,179,238 B2 | 2/2007 | Hissong |
| 7,181,034 B2 | 2/2007 | Armstrong |
| 7,203,331 B2 | 4/2007 | Boesen |
| 7,239,069 B2 | 7/2007 | Cho |
| 7,245,732 B2 | 7/2007 | Jorgensen et al. |
| 7,255,457 B2 | 8/2007 | Ducharme et al. |
| 7,266,208 B2 | 9/2007 | Charvin et al. |
| 7,289,639 B2 | 10/2007 | Abel et al. |
| 7,313,245 B1 | 12/2007 | Shennib |

(56) References Cited

U.S. PATENT DOCUMENTS

| | | |
|---|---|---|
| 7,315,211 B1 | 1/2008 | Lee et al. |
| 7,322,930 B2 | 1/2008 | Jaeger et al. |
| 7,349,741 B2 | 3/2008 | Maltan et al. |
| 7,354,792 B2 | 4/2008 | Mazur et al. |
| 7,376,563 B2 | 5/2008 | Leysieffer et al. |
| 7,390,689 B2 | 6/2008 | Mazur et al. |
| 7,394,909 B1 | 7/2008 | Widmer et al. |
| 7,421,087 B2 | 9/2008 | Perkins et al. |
| 7,424,122 B2 | 9/2008 | Ryan |
| 7,444,877 B2 | 11/2008 | Li et al. |
| 7,547,275 B2 | 6/2009 | Cho et al. |
| 7,630,646 B2 | 12/2009 | Anderson et al. |
| 7,645,877 B2 | 1/2010 | Gmeiner et al. |
| 7,668,325 B2 | 2/2010 | Puria et al. |
| 7,747,295 B2 | 6/2010 | Choi |
| 7,778,434 B2 | 8/2010 | Juneau et al. |
| 7,809,150 B2 | 10/2010 | Natarajan et al. |
| 7,822,215 B2 | 10/2010 | Carazo et al. |
| 7,826,632 B2 | 11/2010 | Von Buol et al. |
| 7,853,033 B2 | 12/2010 | Maltan et al. |
| 7,867,160 B2 | 1/2011 | Pluvinage et al. |
| 7,883,535 B2 | 2/2011 | Cantin et al. |
| 7,885,359 B2 | 2/2011 | Meltzer |
| 7,983,435 B2 | 7/2011 | Moses |
| 8,090,134 B2 | 1/2012 | Takigawa et al. |
| 8,116,494 B2 | 2/2012 | Rass |
| 8,128,551 B2 | 3/2012 | Jolly |
| 8,157,730 B2 | 4/2012 | Leboeuf et al. |
| 8,197,461 B1 | 6/2012 | Arenberg et al. |
| 8,204,786 B2 | 6/2012 | Leboeuf et al. |
| 8,233,651 B1 | 7/2012 | Haller |
| 8,251,903 B2 | 8/2012 | Leboeuf et al. |
| 8,284,970 B2 | 10/2012 | Sacha |
| 8,295,505 B2 | 10/2012 | Weinans et al. |
| 8,295,523 B2 | 10/2012 | Fay et al. |
| 8,320,601 B2 | 11/2012 | Takigawa et al. |
| 8,320,982 B2 | 11/2012 | Leboeuf et al. |
| 8,340,310 B2 | 12/2012 | Ambrose et al. |
| 8,340,335 B1 | 12/2012 | Shennib |
| 8,391,527 B2 | 3/2013 | Feucht et al. |
| 8,396,235 B2 | 3/2013 | Gebhardt et al. |
| 8,396,239 B2 | 3/2013 | Fay et al. |
| 8,401,212 B2 | 3/2013 | Puria et al. |
| 8,401,214 B2 | 3/2013 | Perkins et al. |
| 8,506,473 B2 | 8/2013 | Puria |
| 8,512,242 B2 | 8/2013 | Leboeuf et al. |
| 8,526,651 B2 | 9/2013 | Lafort et al. |
| 8,526,652 B2 | 9/2013 | Ambrose et al. |
| 8,526,971 B2 | 9/2013 | Giniger et al. |
| 8,545,383 B2 | 10/2013 | Wenzel et al. |
| 8,600,089 B2 | 12/2013 | Wenzel et al. |
| 8,647,270 B2 | 2/2014 | Leboeuf et al. |
| 8,652,040 B2 | 2/2014 | Leboeuf et al. |
| 8,684,922 B2 | 4/2014 | Tran |
| 8,696,054 B2 | 4/2014 | Crum |
| 8,696,541 B2 | 4/2014 | Pluvinage et al. |
| 8,700,111 B2 | 4/2014 | Leboeuf et al. |
| 8,702,607 B2 | 4/2014 | Leboeuf et al. |
| 8,715,152 B2 | 5/2014 | Puria et al. |
| 8,715,153 B2 | 5/2014 | Puria et al. |
| 8,715,154 B2 | 5/2014 | Perkins et al. |
| 8,761,423 B2 | 6/2014 | Wagner et al. |
| 8,787,609 B2 | 7/2014 | Perkins et al. |
| 8,788,002 B2 | 7/2014 | Leboeuf et al. |
| 8,817,998 B2 | 8/2014 | Inoue |
| 8,824,715 B2 | 9/2014 | Fay et al. |
| 8,837,758 B2 | 9/2014 | Knudsen |
| 8,845,705 B2 | 9/2014 | Perkins et al. |
| 8,855,323 B2 | 10/2014 | Kroman |
| 8,858,419 B2 | 10/2014 | Puria et al. |
| 8,885,860 B2 | 11/2014 | Djalilian et al. |
| 8,886,269 B2 | 11/2014 | Leboeuf et al. |
| 8,888,701 B2 | 11/2014 | Leboeuf et al. |
| 8,923,941 B2 | 12/2014 | Leboeuf et al. |
| 8,929,965 B2 | 1/2015 | Leboeuf et al. |
| 8,929,966 B2 | 1/2015 | Leboeuf et al. |
| 8,934,952 B2 | 1/2015 | Leboeuf et al. |
| 8,942,776 B2 | 1/2015 | Leboeuf et al. |
| 8,961,415 B2 | 2/2015 | Leboeuf et al. |
| 8,986,187 B2 | 3/2015 | Perkins et al. |
| 8,989,830 B2 | 3/2015 | Leboeuf et al. |
| 9,044,180 B2 | 6/2015 | Leboeuf et al. |
| 9,049,528 B2 | 6/2015 | Fay et al. |
| 9,055,379 B2 | 6/2015 | Puria et al. |
| 9,131,312 B2 | 9/2015 | Leboeuf et al. |
| 9,154,891 B2 | 10/2015 | Puria et al. |
| 9,211,069 B2 | 12/2015 | Larsen et al. |
| 9,226,083 B2 | 12/2015 | Puria et al. |
| 9,277,335 B2 | 3/2016 | Perkins et al. |
| 9,289,135 B2 | 3/2016 | Leboeuf et al. |
| 9,289,175 B2 | 3/2016 | Leboeuf et al. |
| 9,301,696 B2 | 4/2016 | Leboeuf et al. |
| 9,314,167 B2 | 4/2016 | Leboeuf et al. |
| 9,392,377 B2 | 7/2016 | Olsen et al. |
| 9,427,191 B2 | 8/2016 | Leboeuf |
| 9,497,556 B2 | 11/2016 | Kaltenbacher et al. |
| 9,521,962 B2 | 12/2016 | Leboeuf |
| 9,524,092 B2 | 12/2016 | Ren et al. |
| 9,538,921 B2 | 1/2017 | Leboeuf et al. |
| 9,544,700 B2 | 1/2017 | Puria et al. |
| 9,564,862 B2 | 2/2017 | Hoyerby |
| 9,591,409 B2 | 3/2017 | Puria et al. |
| 9,749,758 B2 | 8/2017 | Puria et al. |
| 9,750,462 B2 | 9/2017 | Leboeuf et al. |
| 9,788,785 B2 | 10/2017 | Leboeuf |
| 9,788,794 B2 | 10/2017 | Leboeuf et al. |
| 9,794,653 B2 | 10/2017 | Aumer et al. |
| 9,801,552 B2 | 10/2017 | Romesburg |
| 9,808,204 B2 | 11/2017 | Leboeuf et al. |
| 9,924,276 B2 | 3/2018 | Wenzel |
| 9,930,458 B2 | 3/2018 | Freed et al. |
| 9,949,035 B2 | 4/2018 | Rucker et al. |
| 9,949,039 B2 | 4/2018 | Perkins et al. |
| 9,949,045 B2 | 4/2018 | Kure et al. |
| 9,961,454 B2 | 5/2018 | Puria et al. |
| 9,964,672 B2 | 5/2018 | Phair et al. |
| 10,003,888 B2 | 6/2018 | Stephanou et al. |
| 10,034,103 B2 | 7/2018 | Puria et al. |
| 10,154,352 B2 | 12/2018 | Perkins et al. |
| 10,178,483 B2 | 1/2019 | Teran et al. |
| 10,206,045 B2 | 2/2019 | Kaltenbacher et al. |
| 10,237,663 B2 | 3/2019 | Puria et al. |
| 10,284,964 B2 | 5/2019 | Olsen et al. |
| 10,286,215 B2 | 5/2019 | Perkins et al. |
| 10,292,601 B2 | 5/2019 | Perkins et al. |
| 10,306,381 B2 | 5/2019 | Sandhu et al. |
| 10,492,010 B2 | 11/2019 | Rucker et al. |
| 10,511,913 B2 | 12/2019 | Puria et al. |
| 10,516,946 B2 | 12/2019 | Puria et al. |
| 10,516,949 B2 | 12/2019 | Puria et al. |
| 10,516,950 B2 | 12/2019 | Perkins et al. |
| 10,516,951 B2 | 12/2019 | Wenzel |
| 10,531,206 B2 | 1/2020 | Freed et al. |
| 10,609,492 B2 | 3/2020 | Olsen et al. |
| 10,743,110 B2 | 8/2020 | Puria et al. |
| 10,779,094 B2 | 9/2020 | Rucker et al. |
| 10,863,286 B2 | 12/2020 | Perkins et al. |
| 2001/0003788 A1 | 6/2001 | Ball et al. |
| 2001/0007050 A1 | 7/2001 | Adelman |
| 2001/0024507 A1 | 9/2001 | Boesen |
| 2001/0027342 A1 | 10/2001 | Dormer |
| 2001/0029313 A1 | 10/2001 | Kennedy |
| 2001/0053871 A1 | 12/2001 | Zilberman et al. |
| 2002/0025055 A1 | 2/2002 | Stonikas et al. |
| 2002/0035309 A1 | 3/2002 | Leysieffer |
| 2002/0048374 A1 | 4/2002 | Soli et al. |
| 2002/0085728 A1 | 7/2002 | Shennib et al. |
| 2002/0086715 A1 | 7/2002 | Sahagen |
| 2002/0172350 A1 | 11/2002 | Edwards et al. |
| 2002/0183587 A1 | 12/2002 | Dormer |
| 2003/0021903 A1 | 1/2003 | Shlenker et al. |
| 2003/0055311 A1 | 3/2003 | Neukermans et al. |
| 2003/0064746 A1 | 4/2003 | Rader et al. |
| 2003/0081803 A1 | 5/2003 | Petilli et al. |

(56) References Cited

U.S. PATENT DOCUMENTS

| | | |
|---|---|---|
| 2003/0097178 A1 | 5/2003 | Roberson et al. |
| 2003/0125602 A1 | 7/2003 | Sokolich et al. |
| 2003/0142841 A1 | 7/2003 | Wiegand |
| 2003/0208099 A1 | 11/2003 | Ball |
| 2003/0208888 A1 | 11/2003 | Fearing et al. |
| 2004/0093040 A1* | 5/2004 | Boylston ............ A61N 1/36038 607/57 |
| 2004/0121291 A1 | 6/2004 | Knapp et al. |
| 2004/0158157 A1 | 8/2004 | Jensen et al. |
| 2004/0165742 A1 | 8/2004 | Shennib et al. |
| 2004/0166495 A1 | 8/2004 | Greinwald, Jr. et al. |
| 2004/0167377 A1 | 8/2004 | Schafer et al. |
| 2004/0190734 A1 | 9/2004 | Kates |
| 2004/0202339 A1 | 10/2004 | O'Brien, Jr. et al. |
| 2004/0202340 A1 | 10/2004 | Armstrong et al. |
| 2004/0208333 A1 | 10/2004 | Cheung et al. |
| 2004/0234089 A1 | 11/2004 | Rembrand et al. |
| 2004/0234092 A1 | 11/2004 | Wada et al. |
| 2004/0236416 A1 | 11/2004 | Falotico |
| 2004/0240691 A1 | 12/2004 | Grafenberg |
| 2005/0018859 A1 | 1/2005 | Buchholz |
| 2005/0020873 A1 | 1/2005 | Berrang et al. |
| 2005/0036639 A1 | 2/2005 | Bachler et al. |
| 2005/0038498 A1 | 2/2005 | Dubrow et al. |
| 2005/0088435 A1 | 4/2005 | Geng |
| 2005/0101830 A1 | 5/2005 | Easter et al. |
| 2005/0111683 A1 | 5/2005 | Chabries et al. |
| 2005/0117765 A1 | 6/2005 | Meyer et al. |
| 2005/0190939 A1 | 9/2005 | Fretz |
| 2005/0196005 A1 | 9/2005 | Shennib et al. |
| 2005/0222823 A1 | 10/2005 | Brumback et al. |
| 2005/0226446 A1 | 10/2005 | Luo et al. |
| 2005/0267549 A1 | 12/2005 | Della Santina et al. |
| 2005/0271870 A1 | 12/2005 | Jackson |
| 2005/0288739 A1 | 12/2005 | Hassler, Jr. et al. |
| 2006/0058573 A1 | 3/2006 | Neisz et al. |
| 2006/0062420 A1 | 3/2006 | Araki |
| 2006/0074159 A1 | 4/2006 | Lu et al. |
| 2006/0075175 A1 | 4/2006 | Jensen et al. |
| 2006/0161227 A1 | 7/2006 | Walsh, Jr. et al. |
| 2006/0161255 A1 | 7/2006 | Zarowski et al. |
| 2006/0177079 A1 | 8/2006 | Baekgaard et al. |
| 2006/0177082 A1 | 8/2006 | Solomito, Jr. et al. |
| 2006/0183965 A1 | 8/2006 | Kasic, II et al. |
| 2006/0231914 A1 | 10/2006 | Carey, III et al. |
| 2006/0233398 A1 | 10/2006 | Husung |
| 2006/0237126 A1 | 10/2006 | Guffrey et al. |
| 2006/0247735 A1 | 11/2006 | Honert et al. |
| 2006/0256989 A1 | 11/2006 | Olsen et al. |
| 2006/0278245 A1 | 12/2006 | Gan |
| 2007/0030990 A1 | 2/2007 | Fischer |
| 2007/0036377 A1 | 2/2007 | Stirnemann |
| 2007/0076913 A1 | 4/2007 | Schanz |
| 2007/0083078 A1 | 4/2007 | Easter et al. |
| 2007/0100197 A1 | 5/2007 | Perkins et al. |
| 2007/0127748 A1 | 6/2007 | Carlile et al. |
| 2007/0127752 A1 | 6/2007 | Armstrong |
| 2007/0127766 A1 | 6/2007 | Combest |
| 2007/0135870 A1 | 6/2007 | Shanks et al. |
| 2007/0161848 A1 | 7/2007 | Dalton et al. |
| 2007/0191673 A1 | 8/2007 | Ball et al. |
| 2007/0201713 A1 | 8/2007 | Fang et al. |
| 2007/0206825 A1 | 9/2007 | Thomasson |
| 2007/0223755 A1 | 9/2007 | Salvetti et al. |
| 2007/0225776 A1 | 9/2007 | Fritsch et al. |
| 2007/0236704 A1 | 10/2007 | Carr et al. |
| 2007/0250119 A1 | 10/2007 | Tyler et al. |
| 2007/0251082 A1 | 11/2007 | Milojevic et al. |
| 2007/0258507 A1 | 11/2007 | Lee et al. |
| 2007/0286429 A1 | 12/2007 | Grafenberg et al. |
| 2008/0021518 A1 | 1/2008 | Hochmair et al. |
| 2008/0051623 A1 | 2/2008 | Schneider et al. |
| 2008/0054509 A1 | 3/2008 | Berman et al. |
| 2008/0063228 A1 | 3/2008 | Mejia et al. |
| 2008/0063231 A1 | 3/2008 | Juneau et al. |
| 2008/0077198 A1 | 3/2008 | Webb et al. |
| 2008/0089292 A1 | 4/2008 | Kitazoe et al. |
| 2008/0107292 A1 | 5/2008 | Kornagel |
| 2008/0123866 A1 | 5/2008 | Rule et al. |
| 2008/0130927 A1 | 6/2008 | Theverapperuma et al. |
| 2008/0188707 A1 | 8/2008 | Bernard et al. |
| 2008/0298600 A1 | 12/2008 | Poe et al. |
| 2008/0300703 A1 | 12/2008 | Widmer et al. |
| 2009/0016553 A1 | 1/2009 | Ho et al. |
| 2009/0023976 A1 | 1/2009 | Cho et al. |
| 2009/0043149 A1 | 2/2009 | Abel et al. |
| 2009/0076581 A1 | 3/2009 | Gibson |
| 2009/0131742 A1 | 5/2009 | Cho et al. |
| 2009/0141919 A1 | 6/2009 | Spitaels et al. |
| 2009/0149697 A1 | 6/2009 | Steinhardt et al. |
| 2009/0157143 A1 | 6/2009 | Edler et al. |
| 2009/0175474 A1 | 7/2009 | Salvetti et al. |
| 2009/0246627 A1 | 10/2009 | Park |
| 2009/0253951 A1 | 10/2009 | Ball et al. |
| 2009/0262966 A1 | 10/2009 | Vestergaard et al. |
| 2009/0281367 A1 | 11/2009 | Cho et al. |
| 2009/0310805 A1 | 12/2009 | Petroff |
| 2009/0316922 A1 | 12/2009 | Merks et al. |
| 2010/0036488 A1 | 2/2010 | De, Jr. et al. |
| 2010/0085176 A1 | 4/2010 | Flick |
| 2010/0103404 A1 | 4/2010 | Remke et al. |
| 2010/0114190 A1 | 5/2010 | Bendett et al. |
| 2010/0145135 A1 | 6/2010 | Ball et al. |
| 2010/0171369 A1 | 7/2010 | Baarman et al. |
| 2010/0172507 A1 | 7/2010 | Merks |
| 2010/0177918 A1 | 7/2010 | Keady et al. |
| 2010/0222639 A1 | 9/2010 | Purcell et al. |
| 2010/0260364 A1 | 10/2010 | Merks |
| 2010/0272299 A1* | 10/2010 | Van Schuylenbergh ..................... H04R 25/554 381/315 |
| 2010/0290653 A1 | 11/2010 | Wiggins et al. |
| 2011/0062793 A1 | 3/2011 | Azancot et al. |
| 2011/0069852 A1 | 3/2011 | Arndt et al. |
| 2011/0084654 A1 | 4/2011 | Julstrom et al. |
| 2011/0112462 A1 | 5/2011 | Parker et al. |
| 2011/0116666 A1 | 5/2011 | Dittberner et al. |
| 2011/0125222 A1 | 5/2011 | Perkins et al. |
| 2011/0130622 A1 | 6/2011 | Ilberg et al. |
| 2011/0144414 A1 | 6/2011 | Spearman et al. |
| 2011/0152602 A1 | 6/2011 | Perkins et al. |
| 2011/0164771 A1 | 7/2011 | Jensen et al. |
| 2011/0196460 A1 | 8/2011 | Weiss |
| 2011/0221391 A1 | 9/2011 | Won et al. |
| 2011/0249845 A1 | 10/2011 | Kates |
| 2011/0249847 A1 | 10/2011 | Salvetti et al. |
| 2011/0257290 A1 | 10/2011 | Zeller et al. |
| 2011/0258839 A1 | 10/2011 | Probst |
| 2011/0271965 A1 | 11/2011 | Parkins et al. |
| 2012/0008807 A1 | 1/2012 | Gran |
| 2012/0038881 A1 | 2/2012 | Amirparviz et al. |
| 2012/0039493 A1 | 2/2012 | Rucker et al. |
| 2012/0092461 A1 | 4/2012 | Fisker et al. |
| 2012/0114157 A1 | 5/2012 | Arndt et al. |
| 2012/0140967 A1 | 6/2012 | Aubert et al. |
| 2012/0217087 A1 | 8/2012 | Ambrose et al. |
| 2012/0236524 A1 | 9/2012 | Pugh et al. |
| 2012/0263339 A1 | 10/2012 | Funahashi |
| 2013/0004004 A1 | 1/2013 | Zhao et al. |
| 2013/0034258 A1 | 2/2013 | Lin |
| 2013/0083938 A1 | 4/2013 | Bakalos et al. |
| 2013/0089227 A1 | 4/2013 | Kates |
| 2013/0195300 A1 | 8/2013 | Larsen et al. |
| 2013/0230204 A1 | 9/2013 | Monahan et al. |
| 2013/0303835 A1 | 11/2013 | Koskowich |
| 2013/0308782 A1 | 11/2013 | Dittberner et al. |
| 2013/0308807 A1 | 11/2013 | Burns |
| 2013/0343584 A1 | 12/2013 | Bennett et al. |
| 2013/0343585 A1 | 12/2013 | Bennett et al. |
| 2013/0343587 A1 | 12/2013 | Naylor et al. |
| 2014/0084698 A1 | 3/2014 | Asanuma et al. |
| 2014/0107423 A1 | 4/2014 | Yaacobi |
| 2014/0153761 A1 | 6/2014 | Shennib et al. |
| 2014/0169603 A1 | 6/2014 | Sacha et al. |

(56) References Cited

U.S. PATENT DOCUMENTS

| | | |
|---|---|---|
| 2014/0177863 A1 | 6/2014 | Parkins |
| 2014/0254856 A1 | 9/2014 | Blick et al. |
| 2014/0286514 A1 | 9/2014 | Pluvinage et al. |
| 2014/0288356 A1 | 9/2014 | Van Vlem |
| 2014/0288358 A1 | 9/2014 | Puria et al. |
| 2014/0296620 A1 | 10/2014 | Puria et al. |
| 2014/0321657 A1 | 10/2014 | Stirnemann |
| 2014/0379874 A1 | 12/2014 | Starr et al. |
| 2015/0021568 A1 | 1/2015 | Gong et al. |
| 2015/0049889 A1 | 2/2015 | Bern |
| 2015/0117689 A1 | 4/2015 | Bergs et al. |
| 2015/0124985 A1 | 5/2015 | Kim et al. |
| 2015/0201269 A1 | 7/2015 | Dahl |
| 2015/0222978 A1 | 8/2015 | Murozaki |
| 2015/0245131 A1 | 8/2015 | Facteau et al. |
| 2015/0358743 A1 | 12/2015 | Killion |
| 2016/0008176 A1 | 1/2016 | Goldstein |
| 2016/0064814 A1 | 3/2016 | Jang et al. |
| 2016/0087687 A1 | 3/2016 | Kesler et al. |
| 2016/0094043 A1 | 3/2016 | Hao et al. |
| 2016/0277854 A1 | 9/2016 | Puria et al. |
| 2016/0309265 A1 | 10/2016 | Pluvinage et al. |
| 2016/0309266 A1 | 10/2016 | Olsen et al. |
| 2016/0330555 A1 | 11/2016 | Vonlanthen et al. |
| 2017/0040012 A1 | 2/2017 | Goldstein |
| 2017/0095202 A1 | 4/2017 | Facteau et al. |
| 2017/0195806 A1 | 7/2017 | Atamaniuk et al. |
| 2017/0257710 A1 | 9/2017 | Parker |
| 2018/0077503 A1 | 3/2018 | Shaquer et al. |
| 2018/0077504 A1 | 3/2018 | Shaquer et al. |
| 2018/0213331 A1 | 7/2018 | Rucker et al. |
| 2018/0262846 A1 | 9/2018 | Perkins et al. |
| 2018/0317026 A1 | 11/2018 | Puria |
| 2018/0376255 A1 | 12/2018 | Parker |
| 2019/0158961 A1 | 5/2019 | Puria et al. |
| 2019/0166438 A1 | 5/2019 | Perkins et al. |
| 2019/0230449 A1 | 7/2019 | Puria |
| 2019/0239005 A1 | 8/2019 | Sandhu et al. |
| 2019/0253811 A1 | 8/2019 | Unno et al. |
| 2019/0253815 A1 | 8/2019 | Atamaniuk et al. |
| 2019/0269336 A1 | 9/2019 | Perkins et al. |
| 2020/0007998 A1 | 1/2020 | Rucker et al. |
| 2020/0037082 A1 | 1/2020 | Perkins et al. |
| 2020/0068323 A1 | 2/2020 | Perkins et al. |
| 2020/0084551 A1 | 3/2020 | Puria et al. |
| 2020/0084553 A1 | 3/2020 | Perkins et al. |
| 2020/0092662 A1 | 3/2020 | Wenzel |
| 2020/0092664 A1 | 3/2020 | Freed et al. |
| 2020/0128338 A1 | 4/2020 | Shaquer et al. |
| 2020/0186941 A1 | 6/2020 | Olsen et al. |
| 2020/0186942 A1 | 6/2020 | Flaherty et al. |
| 2020/0374639 A1 | 11/2020 | Rucker et al. |
| 2020/0396551 A1 | 12/2020 | Dy et al. |
| 2021/0029451 A1 | 1/2021 | Fitz et al. |
| 2021/0029474 A1 | 1/2021 | Larkin et al. |

FOREIGN PATENT DOCUMENTS

| | | |
|---|---|---|
| CN | 1176731 A | 3/1998 |
| CN | 101459868 A | 6/2009 |
| CN | 105491496 A | 4/2016 |
| DE | 2044870 A1 | 3/1972 |
| DE | 3243850 A1 | 5/1984 |
| DE | 3508830 A1 | 9/1986 |
| EP | 0092822 A2 | 11/1983 |
| EP | 0242038 A2 | 10/1987 |
| EP | 0291325 A2 | 11/1988 |
| EP | 0296092 A2 | 12/1988 |
| EP | 0242038 A3 | 5/1989 |
| EP | 0296092 A3 | 8/1989 |
| EP | 0352954 A2 | 1/1990 |
| EP | 0291325 A3 | 6/1990 |
| EP | 0352954 A3 | 8/1991 |
| EP | 1035753 A1 | 9/2000 |
| EP | 1435757 A1 | 7/2004 |
| EP | 1845919 A1 | 10/2007 |
| EP | 1955407 A1 | 8/2008 |
| EP | 1845919 B1 | 9/2010 |
| EP | 2272520 A1 | 1/2011 |
| EP | 2301262 A1 | 3/2011 |
| EP | 2752030 A1 | 7/2014 |
| EP | 3101519 A1 | 12/2016 |
| EP | 2425502 B1 | 1/2017 |
| EP | 2907294 B1 | 5/2017 |
| EP | 3183814 A1 | 6/2017 |
| EP | 3094067 B1 | 10/2017 |
| EP | 3006079 B1 | 3/2019 |
| FR | 2455820 A1 | 11/1980 |
| GB | 2085694 A | 4/1982 |
| JP | S60154800 A | 8/1985 |
| JP | S621726 B2 | 1/1987 |
| JP | S6443252 A | 2/1989 |
| JP | H0932709 A | 12/1997 |
| JP | 2000504913 A | 4/2000 |
| JP | 2004187953 A | 7/2004 |
| JP | 2004193908 A | 7/2004 |
| JP | 2005516505 A | 6/2005 |
| JP | 2006060833 A | 3/2006 |
| KR | 100624445 B1 | 9/2006 |
| WO | WO-9209181 A1 | 5/1992 |
| WO | WO-9501678 A1 | 1/1995 |
| WO | WO-9621334 A1 | 7/1996 |
| WO | WO-9736457 A1 | 10/1997 |
| WO | WO-9745074 A1 | 12/1997 |
| WO | WO-9806236 A1 | 2/1998 |
| WO | WO-9903146 A1 | 1/1999 |
| WO | WO-9915111 A1 | 4/1999 |
| WO | WO-0022875 A2 | 4/2000 |
| WO | WO-0022875 A3 | 7/2000 |
| WO | WO-0150815 A1 | 7/2001 |
| WO | WO-0158206 A2 | 8/2001 |
| WO | WO-0176059 A2 | 10/2001 |
| WO | WO-0158206 A3 | 2/2002 |
| WO | WO-0239874 A2 | 5/2002 |
| WO | WO-0239874 A3 | 2/2003 |
| WO | WO-03030772 A2 | 4/2003 |
| WO | WO-03063542 A2 | 7/2003 |
| WO | WO-03063542 A3 | 1/2004 |
| WO | WO-2004010733 A1 | 1/2004 |
| WO | WO-2005015952 A1 | 2/2005 |
| WO | WO-2005107320 A1 | 11/2005 |
| WO | WO-2006014915 A2 | 2/2006 |
| WO | WO-2006037156 A1 | 4/2006 |
| WO | WO-2006039146 A2 | 4/2006 |
| WO | WO-2006042298 A2 | 4/2006 |
| WO | WO-2006071210 A1 | 7/2006 |
| WO | WO-2006075169 A1 | 7/2006 |
| WO | WO-2006075175 A1 | 7/2006 |
| WO | WO-2006118819 A2 | 11/2006 |
| WO | WO-2006042298 A3 | 12/2006 |
| WO | WO-2007023164 A1 | 3/2007 |
| WO | WO-2009046329 A1 | 4/2009 |
| WO | WO-2009047370 A2 | 4/2009 |
| WO | WO-2009049320 A1 | 4/2009 |
| WO | WO-2009056167 A1 | 5/2009 |
| WO | WO-2009062142 A1 | 5/2009 |
| WO | WO-2009047370 A3 | 7/2009 |
| WO | WO-2009125903 A1 | 10/2009 |
| WO | WO-2009145842 A2 | 12/2009 |
| WO | WO-2009146151 A2 | 12/2009 |
| WO | WO-2009155358 A1 | 12/2009 |
| WO | WO-2009155361 A1 | 12/2009 |
| WO | WO-2009155385 A1 | 12/2009 |
| WO | WO-2010033932 A1 | 3/2010 |
| WO | WO-2010033933 A1 | 3/2010 |
| WO | WO-2010077781 A2 | 7/2010 |
| WO | WO-2010147935 A1 | 12/2010 |
| WO | WO-2010148345 A2 | 12/2010 |
| WO | WO-2011005500 A2 | 1/2011 |
| WO | WO-2012088187 A2 | 6/2012 |
| WO | WO-2012149970 A1 | 11/2012 |
| WO | WO-2013016336 A2 | 1/2013 |
| WO | WO-2016011044 A1 | 1/2016 |
| WO | WO-2016045709 A1 | 3/2016 |

(56) References Cited

FOREIGN PATENT DOCUMENTS

| WO | WO-2016146487 A1 | 9/2016 |
| WO | WO-2017045700 A1 | 3/2017 |
| WO | WO-2017059218 A1 | 4/2017 |
| WO | WO-2017059240 A1 | 4/2017 |
| WO | WO-2017116791 A1 | 7/2017 |
| WO | WO-2017116865 A1 | 7/2017 |
| WO | WO-2018048794 A1 | 3/2018 |
| WO | WO-2018081121 A1 | 5/2018 |
| WO | WO-2018093733 A1 | 5/2018 |
| WO | WO-2019055308 A1 | 3/2019 |
| WO | WO-2019173470 A1 | 9/2019 |
| WO | WO-2019199680 A1 | 10/2019 |
| WO | WO-2019199683 A1 | 10/2019 |
| WO | WO-2020028082 A1 | 2/2020 |
| WO | WO-2020028083 A1 | 2/2020 |
| WO | WO-2020028084 A1 | 2/2020 |
| WO | WO-2020028085 A1 | 2/2020 |
| WO | WO-2020028086 A1 | 2/2020 |
| WO | WO-2020028087 A1 | 2/2020 |
| WO | WO-2020028088 A1 | 2/2020 |
| WO | WO-2020176086 A1 | 9/2020 |
| WO | WO-2021003087 A1 | 1/2021 |

OTHER PUBLICATIONS

Asbeck, et al. Scaling Hard Vertical Surfaces with Compliant Microspine Arrays, The International Journal of Robotics Research 2006; 25; 1165-79.

Atasoy [Paper] Opto-acoustic Imaging. for BYM504E Biomedical Imaging Systems class at ITU, downloaded from the Internet www2.itu.edu.td—cilesiz/courses/BYM504- 2005-OA 504041413.pdf, 14 pages.

Athanassiou, et al. Laser controlled photomechanical actuation of photochromic polymers Microsystems. Rev. Adv. Mater. Sci. 2003; 5:245-251.

Autumn, et al. Dynamics of geckos running vertically, The Journal of Experimental Biology 209, 260-272, (2006).

Autumn, et al., Evidence for van der Waals adhesion in gecko setae, www.pnas.orgycgiydoiy10.1073ypnas.192252799 (2002).

Ayatollahi, et al. Design and Modeling of Micromachined Condenser MEMS Loudspeaker using Permanent Magnet Neodymium-Iron-Boron (Nd—Fe—B). IEEE International Conference on Semiconductor Electronics, 2006. ICSE '06, Oct. 29, 2006-Dec. 1, 2006; 160-166.

Baer, et al. Effects of Low Pass Filtering on the Intelligibility of Speech in Noise for People With and Without Dead Regions at High Frequencies. J. Acost. Soc. Am 112 (3), pt. 1, (Sep. 2002), pp. 1133-1144.

Best, et al. The influence of high frequencies on speech localization. Abstract 981 (Feb. 24, 2003) from www.aro.org/abstracts/abstracts.html.

Birch, et al. Microengineered systems for the hearing impaired. IEE Colloquium on Medical Applications of Microengineering, Jan. 31, 1996; pp. 2/1-2/5.

Boedts. Tympanic epithelial migration, Clinical Otolaryngology 1978, 3, 249-253.

Burkhard, et al. Anthropometric Manikin for Acoustic Research. J. Acoust. Soc. Am., vol. 58, No. 1, (Jul. 1975), pp. 214-222.

Camacho-Lopez, et al. Fast Liquid Crystal Elastomer Swims Into the Dark, Electronic Liquid Crystal Communications. Nov. 26, 2003; 9 pages total.

Carlile, et al. Frequency bandwidth and multi-talker environments. Audio Engineering Society Convention 120. Audio Engineering Society, May 20-23, 2006. Paris, France. 118: 8 pages.

Carlile, et al. Spatialisation of talkers and the segregation of concurrent speech. Abstract 1264 (Feb. 24, 2004) from www.aro.org/abstracts/abstracts.html.

Cheng, et al. A Silicon Microspeaker for Hearing Instruments. Journal of Micromechanics and Microengineering 2004; 14(7):859-866.

Dictionary.com's (via American Heritage Medical Dictionary) online dictionary definition of 'percutaneous'. Accessed on Jun. 3, 2013. 2 pages.

Merriam-Webster's online dictionary definition of 'percutaneous'. Accessed on Jun. 3, 2013. 3 pages.

Datskos, et al. Photoinduced and thermal stress in silicon microcantilevers. Applied Physics Letters. Oct. 19, 1998; 73(16):2319-2321.

Decraemer, et al. A method for determining three-dimensional vibration in the ear. Hearing Res., 77:19-37 (1994).

Dundas et al. The Earlens Light-Driven Hearing Aid: Top 10 questions and answers. Hearing Review. 2018;25(2):36-39.

Ear. Downloaded from the Internet. Accessed Jun. 17, 2008. 4 pages. URL: http://wwwmgs.bionet.nsc.ru/mgs/gnw/trrd/thesaurus/Se/ear.html.

Edinger, J.R. High-Quality Audio Amplifier With Automatic Bias Control. Audio Engineering; Jun. 1947; pp. 7-9.

Fay. Cat eardrum mechanics. Ph.D. thesis. Dissertation submitted to Department of Aeronautics and Astronautics. Standford University. May 2001; 210 pages total.

Fay, et al. Cat eardrum response mechanics. Mechanics and Computation Division. Department of Mechanical Engineering. Standford University. 2002; 10 pages total.

Fay, et al. Preliminary evaluation of a light-based contact hearing device for the hearing impaired. Otol Neurotol. Jul. 2013;34(5):912-21. doi: 10.1097/MAO.0b013e31827de4b1.

Fay, et al. The discordant eardrum, PNAS, Dec. 26, 2006, vol. 103, No. 52, p. 19743-19748.

Fletcher. Effects of Distortion on the Individual Speech Sounds. Chapter 18, ASA Edition of Speech and Hearing in Communication, Acoust Soc.of Am. (republished in 1995) pp. 415-423.

Freyman, et al. Spatial Release from Informational Masking in Speech Recognition. J. Acost. Soc. Am., vol. 109, No. 5, pt. 1, (May 2001); 2112-2122.

Freyman, et al. The Role of Perceived Spatial Separation in the Unmasking of Speech. J. Acoust. Soc. Am., vol. 106, No. 6, (Dec. 1999); 3578-3588.

Fritsch, et al. EarLens transducer behavior in high-field strength MRI scanners. Otolaryngol Head Neck Surg. Mar. 2009;140(3):426-8. doi: 10.1016/j.otohns.2008.10.016.

Galbraith et al. A wide-band efficient inductive transdermal power and data link with coupling insensitive gain IEEE Trans Biomed Eng. Apr. 1987;34(4):265-75.

Gantz, et al. Broad Spectrum Amplification with a Light Driven Hearing System. Combined Otolaryngology Spring Meetings, 2016 (Chicago).

Gantz, et al. Light Driven Hearing System: A Multi-Center Clinical Study. Association for Research in Otolaryngology Annual Meeting, 2016 (San Diego).

Gantz, et al. Light-Driven Contact Hearing Aid for Broad Spectrum Amplification: Safety and Effectiveness Pivotal Study. Otology & Neurotology Journal, 2016 (in review).

Gantz, et al. Light-Driven Contact Hearing Aid for Broad-Spectrum Amplification: Safety and Effectiveness Pivotal Study. Otology & Neurotology. Copyright 2016. 7 pages.

Ge, et al., Carbon nanotube-based synthetic gecko tapes, p. 10792-10795, PNAS, Jun. 26, 2007, vol. 104, No. 26.

Gennum. GA3280 Preliminary Data Sheet: Voyageur TD Open Platform DSP System for Ultra Low Power Audio Processing. Oct. 2006; 17 pages. Downloaded from the Internet: http://www.sounddesigntechnologies.com/products/pdf/37601DOC.pdf.

Gobin, et al. Comments on the physical basis of the active materials concept. Proc. SPIE 2003; 4512:84-92.

Gorb, et al. Structural Design and Biomechanics of Friction-Based Releasable Attachment Devices in Insects. Integr Comp Biol. Dec. 2002 42(6):1127-1139. doi: 10.1093/icb/42.6.1127.

Hakansson, et al. Percutaneous vs. transcutaneous transducers for hearing by direct bone conduction (Abstract). Otolaryngol Head Neck Surg. Apr. 1990;102(4):339-44.

Hato, et al. Three-dimensional stapes footplate motion in human temporal bones. Audiol. Neurootol., 8:140-152 (Jan. 30, 2003).

(56) References Cited

OTHER PUBLICATIONS

Headphones. Wikipedia Entry. Downloaded from the Internet. Accessed Oct. 27, 2008. 7 pages. URL: http://en.wikipedia.org/wiki/Headphones>.
Hofman, et al. Relearning Sound Localization With New Ears. Nature Neuroscience, vol. 1, No. 5, (Sep. 1998); 417-421.
International Search Report and Written Opinion dated Jan. 18, 2018 for International PCT Patent Application No. PCT/US2017/050062.
Izzo, et al. Laser Stimulation of Auditory Neurons: Effect of Shorter Pulse Duration and Penetration Depth. Biophys J. Apr. 15, 2008;94(8):3159-3166.
Izzo, et al. Laser Stimulation of the Auditory Nerve. Lasers Surg Med. Sep. 2006;38(8):745-753.
Izzo, et al. Selectivity of Neural Stimulation in the Auditory System: A Comparison of Optic and Electric Stimuli. J Biomed Opt. Mar.-Apr. 2007;12(2):021008.
Jackson, et al. Multiphoton and Transmission Electron Microscopy of Collagen in Ex Vivo Tympanic Membranes. Ninth Annual Symposium on Biomedical Computation at Stanford (BCATS). BCATS 2008 Abstract Book. Poster 18:56. Oct. 2008. URL: http://www.stanford.edu/~purial/BCATS08.html.
Jian, et al. A 0.6 V, 1.66 mW energy harvester and audio driver for tympanic membrane transducer with wirelessly optical signal and power transfer. InCircuits and Systems (ISCAS), 2014 IEEE International Symposium on Jun. 1, 2014. 874-7. IEEE.
Jin, et al. Speech Localization. J. Audio Eng. Soc. convention paper, presented at the AES 112th Convention, Munich, Germany, May 10-13, 2002, 13 pages total.
Khaleghi, et al. Attenuating the ear canal feedback pressure of a laser-driven hearing aid. J Acoust Soc Am. Mar. 2017;141(3):1683.
Khaleghi et al. Attenuating the feedback pressure of a light-activated hearing device to allows microphone placement at the ear canal entrance. IHCON 2016, International Hearing Aid Research Conference, Tahoe City, CA, Aug. 2016.
Khaleghi, et al. Characterization of Ear-Canal Feedback Pressure due to Umbo-Drive Forces: Finite-Element vs. Circuit Models. ARO Midwinter Meeting 2016, (San Diego).
Khaleghi et al. Mechano-Electro-Magnetic Finite Element Model of a Balanced Armature Transducer for a Contact Hearing Aid. Proc. MoH 2017, Mechanics of Hearing workshop, Brock University, Jun. 2017.
Khaleghi et al. Multiphysics Finite Element Model of a Balanced Armature Transducer used in a Contact Hearing Device. ARO 2017, 40th ARO MidWinter Meeting, Baltimore, MD, Feb. 2017.
Kiessling, et al. Occlusion Effect of Earmolds with Different Venting Systems. J Am Acad Audiol. Apr. 2005;16(4):237-49.
Killion, et al. The case of the missing dots: AI and SNR loss. The Hearing Journal, 1998. 51(5), 32-47.
Killion. Myths About Hearing in Noise and Directional Microphones. The Hearing Review. Feb. 2004; 11(2):14, 16, 18, 19, 72 & 73.
Killion. SNR loss: I can hear what people say but I can't understand them. The Hearing Review, 1997; 4(12):8-14.
Lee, et al. A Novel Opto-Electromagnetic Actuator Coupled to the tympanic Membrane. J Biomech. Dec. 5, 2008;41(16):3515-8. Epub Nov. 7, 2008.
Lee, et al. The optimal magnetic force for a novel actuator coupled to the tympanic membrane: a finite element analysis. Biomedical engineering: applications, basis and communications. 2007; 19(3):171-177.
Levy, et al. Characterization of the available feedback gain margin at two device microphone locations, in the fossa triangularis and Behind the Ear, for the light-based contact hearing device. Acoustical Society of America (ASA) meeting, 2013 (San Francisco).
Levy, et al. Extended High-Frequency Bandwidth Improves Speech Reception in the Presence of Spatially Separated Masking Speech. Ear Hear. Sep.-Oct. 2015;36(5):e214-24. doi: 10.1097/AUD.0000000000000161.
Levy et al. Light-driven contact hearing aid: a removable direct-drive hearing device option for mild to severe sensorineural hearing impairment. Conference on Implantable Auditory Prostheses, Tahoe City, CA, Jul. 2017. 4 pages.
Lezal. Chalcogenide glasses—survey and progress. Journal of Optoelectronics and Advanced Materials. Mar. 2003; 5(1):23-34.
Mah. Fundamentals of photovoltaic materials. National Solar Power Research Institute. Dec. 21, 1998, 3-9.
Makino, et al. Epithelial migration in the healing process of tympanic membrane perforations. Eur Arch Otorhinolaryngol. 1990; 247: 352-355.
Makino, et al., Epithelial migration on the tympanic membrane and external canal, Arch Otorhinolaryngol (1986) 243:39-42.
Markoff. Intuition + Money: An Aha Moment. New York Times Oct. 11, 2008, p. BU4, 3 pages total.
Martin, et al. Utility of Monaural Spectral Cues is Enhanced in the Presence of Cues to Sound-Source Lateral Angle. JARO. 2004; 5:80-89.
McElveen et al. Overcoming High-Frequency Limitations of Air Conduction Hearing Devices Using a Light-Driven Contact Hearing Aid. Poster presentation at The Triological Society, 120th Annual Meeting at COSM, Apr. 28, 2017; San Diego, CA.
Michaels, et al., Auditory epithelial migration on the human tympanic membrane: II. The existence of two discrete migratory pathways and their embryologic correlates. Am J Anat. Nov. 1990 189(3):189-200. DOI: 10.1002/aja.1001890302.
Moore, et al. Perceived naturalness of spectrally distorted speech and music. J Acoust Soc Am. Jul. 2003;114(1):408-19.
Moore, et al. Spectro-temporal characteristics of speech at high frequencies, and the potential for restoration of audibility to people with mild-to-moderate hearing loss. Ear Hear. Dec. 2008;29(6):907-22. doi: 10.1097/AUD.0b013e31818246f6.
Moore. Loudness perception and intensity resolution. Cochlear Hearing Loss, Chapter 4, pp. 90-115, Whurr Publishers Ltd., London (1998).
Murphy, et al. Adhesion and anisotropic friction enhancements of angled heterogeneous micro-fiber arrays with spherical and spatula tips. Journal of Adhesion Science and Technology. vol. 21. No. 12-13. Aug. 2007. pp. 1281-1296. DOI: 10.1163/156856107782328380.
Murugasu, et al. Malleus-to-footplate versus malleus-to-stapes-head ossicular reconstruction prostheses: temporal bone pressure gain measurements and clinical audiological data. Otol Neurotol. Jul. 2005;26(4):572-82. DOI: 10.1097/01.mao.0000178151.44505.1b.
Musicant, et al. Direction-dependent spectral properties of cat external ear: new data and cross-species comparisons. J Acoust Soc Am. Feb. 1990 87(2):757-781. DOI: 10.1121/1.399545.
National Semiconductor. LM4673 Boomer: Filterless, 2.65W, Mono, Class D Audio Power Amplifier. Nov. 1, 2007. 24 pages. [Data Sheet] downloaded from the Internet: URL: http://www.national.com/ds/LM/LM4673.pdf.
Nishihara, et al. Effect of changes in mass on middle ear function. Otolaryngol Head Neck Surg. Nov. 1993;109(5):889-910.
O'Connor, et al. Middle ear Cavity and Ear Canal Pressure-Driven Stapes Velocity Responses in Human Cadaveric Temporal Bones. J Acoust Soc Am. Sep. 2006;120(3):1517-28.
Park, et al. Design and analysis of a microelectromagnetic vibration transducer used as an implantable middle ear hearing aid. J. Micromech. Microeng. vol. 12 (2002), pp. 505-511.
Perkins, et al. Light-based Contact Hearing Device: Characterization of available Feedback Gain Margin at two device microphone locations. Presented at AAO-HNSF Annual Meeting, 2013 (Vancouver).
Perkins, et al. The EarLens Photonic Transducer: Extended bandwidth. Presented at AAO-HNSF Annual Meeting, 2011 (San Francisco).
Perkins, et al. The EarLens System: New sound transduction methods. Hear Res. Feb. 2, 2010; 10 pages total.
Perkins, R. Earlens tympanic contact transducer: a new method of sound transduction to the human ear. Otolaryngol Head Neck Surg. Jun. 1996;114(6):720-8.
Poosanaas, et al. Influence of sample thickness on the performance of photostrictive ceramics, J. App. Phys. Aug. 1, 1998; 84(3):1508-1512.

(56) References Cited

OTHER PUBLICATIONS

Puria et al. A gear in the middle ear. ARO Denver CO, 2007b.
Puria, et al. Cues above 4 kilohertz can improve spatially separated speech recognition. The Journal of the Acoustical Society of America, 2011, 129, 2384.
Puria, et al. Extending bandwidth above 4 kHz improves speech understanding in the presence of masking speech. Association for Research in Otolaryngology Annual Meeting, 2012 (San Diego).
Puria, et al. Extending bandwidth provides the brain what it needs to improve hearing in noise. First international conference on cognitive hearing science for communication, 2011 (Linkoping, Sweden).
Puria, et al. Hearing Restoration: Improved Multi-talker Speech Understanding. 5th International Symposium on Middle Ear Mechanics in Research and Otology (MEMRO), Jun. 2009 (Stanford University).
Puria, et al. Imaging, Physiology and Biomechanics of the middle ear: Towards understating the functional consequences of anatomy. Stanford Mechanics and Computation Symposium, 2005, ed Fong J.
Puria, et al. Malleus-to-footplate ossicular reconstruction prosthesis positioning: cochleovestibular pressure optimization. Otol Nerotol. May 2005; 26(3):368-379. DOI: 10.1097/01.mao.0000169788.07460.4a.
Puria, et al. Measurements and model of the cat middle ear: Evidence of tympanic membrane acoustic delay. J. Acoust. Soc. Am., 104(6):3463-3481 (Dec. 1998).
Puria, et al., Mechano-Acoustical Transformations in A. Basbaum et al., eds., The Senses: A Comprehensive Reference, v3, p. 165-201, Academic Press (2008).
Puria, et al. Middle Ear Morphometry From Cadaveric Temporal Bone MicroCT Imaging. Proceedings of the 4th International Symposium, Zurich, Switzerland, Jul. 27-30, 2006, Middle Ear Mechanics in Research and Otology, pp. 260-269.
Puria, et al. Sound-Pressure Measurements in The Cochlear Vestibule of Human-Cadaver Ears. Journal of the Acoustical Society of America. 1997; 101 (5-1): 2754-2770.
Puria, et al. Temporal-Bone Measurements of the Maximum Equivalent Pressure Output and Maximum Stable Gain of a Light-Driven Hearing System That Mechanically Stimulates the Umbo. Otol Neurotol. Feb. 2016;37(2):160-6. doi: 10.1097/MAO.0000000000000941.
Puria, et al. The EarLens Photonic Hearing Aid. Association for Research in Otolaryngology Annual Meeting, 2012 (San Diego).
Puria, et al. The Effects of bandwidth and microphone location on understanding of masked speech by normal-hearing and hearing-impaired listeners. International Conference for Hearing Aid Research (IHCON) meeting, 2012 (Tahoe City).
Puria, et al. Tympanic-membrane and malleus-incus-complex co-adaptations for high-frequency hearing in mammals. Hear Res. May 2010;263(1-2):183-90. doi: 10.1016/j.heares.2009.10.013. Epub Oct. 28, 2009.
Puria. Measurements of human middle ear forward and reverse acoustics: implications for otoacoustic emissions. J Acoust Soc Am. May 2003;113(5):2773-89.
Puria, S. Middle Ear Hearing Devices. Chapter 10. Part of the series Springer Handbook of Auditory Research pp. 273-308. Date: Feb. 9, 2013.
Qu, et al. Carbon nanotube arrays with strong shear binding-on and easy normal lifting-off. Science. Oct. 10, 2008. 322(5899):238-342. doi: 10.1126/science.1159503.
Robles, et al. Mechanics of the mammalian cochlea. Physiol Rev. Jul. 2001;81(3):1305-52.
Roush. SiOnyx Brings "Black Silicon" into the Light; Material Could Upend Solar, Imaging Industries. Xconomy, Oct. 12, 2008, retrieved from the Internet: www.xconomy.com/boston/2008/10/12/sionyx-brings-black-silicon-into-the-light¬material-could-upend-solar-imaging-industries 4 pages total.
Rubinstein. How cochlear implants encode speech. Curr Opin Otolaryngol Head Neck Surg. Oct. 12, 2004(5):444-448. DOI: 10.1097/01.moo.0000134452.24819.c0.
School of Physics Sydney, Australia. Acoustic Compliance, Inertance and Impedance. 1-6. (2018). http://www.animations.physics.unsw.edu.au/jw/compliance-inertance-impedance.htm.
Sekaric, et al. Nanomechanical resonant structures as tunable passive modulators. Applied Physics Letters. May 2002. 80(19):3617-3619. DOI: 10.1063/1.1479209.
Shaw. Transformation of Sound Pressure Level From the Free Field to the Eardrum in the Horizontal Plane. J. Acoust. Soc. Am., vol. 56, No. 6, (Dec. 1974), 1848-1861.
Shih, et al. Shape and displacement control of beams with various boundary conditions via photostrictive optical actuators. Proc. IMECE. Nov. 2003; 1-10.
Smith. The Scientist and Engineers Guide to Digital Signal Processing. California Technical Publishing. 1997. Chapter 22. pp. 351-372.
Song, et al. The development of a non-surgical direct drive hearing device with a wireless actuator coupled to the tympanic membrane. Applied Acoustics. Dec. 31, 2013;74(12):1511-8.
Sound Design Technologies. Voyager TD Open Platform DSP System for Ultra Low Power Audio Processing—GA3280 Data Sheet. Oct. 2007 15 pages. Retrieved from the Internet: http://www.sounddes.com/pdf/37601DOC.pdf.
Spolenak, et al. Effects of contact shape on the scaling of biological attachments. Proc. R. Soc. A. 2005; 461:305-319.
Stenfelt, et al. Bone-Conducted Sound: Physiological and Clinical Aspects. Otology & Neurotology, Nov. 2005; 26 (6):1245-1261.
Struck, et al. Comparison of Real-world Bandwidth in Hearing Aids vs Earlens Light-driven Hearing Aid System. The Hearing Review. TechTopic: EarLens. Hearingreview.com. Mar. 14, 2017. pp. 24-28.
Stuchlik, et al. Micro-Nano Actuators Driven by Polarized Light. IEEE Proc. Sci. Meas. Techn. Mar. 2004; 151(2):131-136.
Suski, et al. Optically activated ZnO/SiO2/Si cantilever beams. Sensors and Actuators A: Physical. Sep. 1990. 24(3): 221-225. https://doi.org/10.1016/0924-4247(90)80062-A.
Takagi, et al. Mechanochemical Synthesis of Piezoelectric PLZT Powder. KONA. 2003; 51(21):234-241.
Thakoor, et al. Optical microactuation in piezoceramics. Proc. SPIE. Jul. 1998; 3328:376-391.
Thompson. Tutorial on microphone technologies for directional hearing aids. Hearing Journal. Nov. 2003; 56(11):14-16,18, 20-21.
Tzou, et al. Smart Materials, Precision Sensors/Actuators, Smart Structures, and Structronic Systems. Mechanics of Advanced Materials and Structures. 2004; 11:367-393.
Uchino, et al. Photostricitve actuators. Ferroelectrics. 2001; 258:147-158.
U.S. Appl. No. 15/384,013 Notice of Allowance dated Jan. 9, 2019.
U.S. Appl. No. 15/710,712 Office Action dated Oct. 12, 2018.
Vickers, et al. Effects of Low-Pass Filtering on the Intelligibility of Speech in Quiet for People With and Without Dead Regions at High Frequencies. J. Acoust. Soc. Am. Aug. 2001; 110(2):1164-1175.
Vinge. Wireless Energy Transfer by Resonant Inductive Coupling. Master of Science Thesis. Chalmers University of Technology. 1-83 (2015).
Vinikman-Pinhasi, et al. Piezoelectric and Piezooptic Effects in Porous Silicon. Applied Physics Letters, Mar. 2006; 88(11): 111905-1-111905-2. DOI: 10.1063/1.2186395.
Wang, et al. Preliminary Assessment of Remote Photoelectric Excitation of an Actuator for a Hearing Implant. Proceeding of the 2005 IEEE, Engineering in Medicine and Biology 27th nnual Conference, Shanghai, China. Sep. 1-4, 2005; 6233-6234.
Web Books Publishing, "The Ear," accessed online Jan. 22, 2013, available online Nov. 2, 2007 at http://www.web-books.com/eLibrary/Medicine/Physiology/Ear/Ear.htm.
Wiener, et al. On the Sound Pressure Transformation by the Head and Auditory Meatus of the Cat. Acta Otolaryngol. Mar. 1966; 61(3):255-269.
Wightman, et al. Monaural Sound Localization Revisited. J Acoust Soc Am. Feb. 1997;101(2):1050-1063.
Wiki. Sliding Bias Variant 1, Dynamic Hearing (2015).

(56) References Cited

OTHER PUBLICATIONS

Wikipedia. Inductive Coupling. 1-2 (Jan. 11, 2018). https://en.wikipedia.org/wiki/Inductive_coupling.
Wikipedia. Pulse-density Coupling. 1-4 (Apr. 6, 2017). https://en.wikipedia.org/wiki/Pulse-density_modulation.
Wikipedia. Resonant Inductive Coupling. 1-11 (Jan. 12, 2018). https://en.wikipedia.org/wiki/Resonant_inductive_coupling#cite_note-13.
Yao, et al. Adhesion and sliding response of a biologically inspired fibrillar surface: experimental observations, J. R. Soc. Interface (2008) 5, 723-733 doi:10.1098/rsif.2007.1225 Published online Oct. 30, 2007.
Yao, et al. Maximum strength for intermolecular adhesion of nanospheres at an optimal size. J R Soc Interface. Nov. 6, 2008;5(28):1363-70. doi: 10.1098/rsif.2008.0066.
Yi, et al. Piezoelectric Microspeaker with Compressive Nitride Diaphragm. The Fifteenth IEEE International Conference on Micro Electro Mechanical Systems, 2002; 260-263.
Yu, et al. Photomechanics: Directed bending of a polymer film by light. Nature. Sep. 11, 2003;425(6954):145. DOI: 10.1038/425145a.
European search report and opinion dated Mar. 30, 2020 for EP Application No. 17849390.4.
Office action dated May 28, 2020 for U.S. Appl. No. 16/717,796.
U.S. Appl. No. 15/695,566 Office Action dated Dec. 12, 2019.
U.S. Appl. No. 15/695,566 Office Action dated Feb. 19, 2019.
U.S. Appl. No. 15/710,712 Office Action dated Jun. 17, 2019.

\* cited by examiner

CONTACT HEARING SYSTEMS, APPARATUS AND METHODS

CROSS-REFERENCE

This application is a continuation of U.S. patent application Ser. No. 15/695,566, filed Sep. 5, 2017; which claims priority to U.S. Provisional Application No. 62/385,914, filed Sep. 9, 2016, which are incorporated herein by reference in their entirety.

This application is related to the following copending patent applications: U.S. patent application Ser. No. 15/710,712, filed Sep. 20, 2017; and U.S. patent application Ser. No. 16/717,796, filed Dec. 17, 2019; which are incorporated herein by reference.

BACKGROUND OF THE INVENTIION

In contact hearing aid systems, the system, including a contact hearing device, an ear tip and an audio processor, is employed to enhance the hearing of a user. Depending upon the contact hearing aid, the system may also include an external communication device, such as a cellular phone, which communicates with the audio processor. An example of such system is the Earlens Light Driven Hearing Aid manufactured by Earlens Corporation. The Earlens hearing-aid transmits an audio signal by laser to a tympanic membrane transducer which is placed on an ear drum of a user. In such systems, it may be beneficial to add smart components to the contact hearing device in order to improve the overall function and/or efficiency of the system. It may also be beneficial to use alternative methods of transmitting the signal and/or the energy required to power the contact hearing device and/or electronic components on the contact hearing device.

As an example, in some prior contact hearing aid systems, e.g., those using light to transmit sound to a contact hearing device positioned on the tympanic membrane of a user, it was beneficial to bias the transmitted signal in order to transmit both positive and negative elements of the encoded data (e.g., sound signal) from a lateral ear canal assembly positioned in the user's ear canal to a medial ear canal assembly positioned on the user's tympanic membrane. The transmitted signal was then received, by, for example, a photodetector, and transmitted directly to the vibratory load, e.g., a transducer assembly. In such systems, the bias consumed a significant amount of energy in the transmitted signal. In some devices, the amount of energy required for the bias signal was reduced by using a sliding bias. In such systems, the bias is changed according to the level of the incoming sounds, with a smaller bias for lower level input sounds and a larger bias for higher level input sounds. Unfortunately, the use of a sliding bias, while reducing the amount of energy required for the bias, does not eliminate the need for a bias signal, which consumes energy, potentially resulting in a shorter battery life or the need for a larger battery. Further, the use of a sliding bias may result in sound artifacts which are audible to the hearing aid wearer. Thus, it would be beneficial to design a system which does not require a bias to transmit data and power to the lateral ear canal assembly.

Further, in prior systems, the input from the lateral ear canal assembly would be used to drive the output of the medial ear canal assembly directly with the data and power signals remaining combined. In these devices, the level of the output of the medial ear canal assembly was a function of the level of the input to the medial ear canal assembly. This arrangement could be disadvantageous because the output of the medial ear canal assembly was subject to change, by, for example, changes in the distance between the medial and lateral ear canal assemblies, which may be caused by, for example, the positioning of the lateral ear canal assembly in the ear.

Further, in prior systems, such as those using light to transmit sound through the ear canal of a user or from a lateral hearing aid assembly to a medial hearing aid assembly, it may be difficult to obtain and maintain alignment between the transmitting element (e.g., a laser) on the lateral ear canal assembly and the receiving element (e.g., a photodetector) on the medial ear canal assembly. For example, the alignment may depend upon the placement of transmitting and receiving elements in the ear canal, if they are not properly placed, the alignment may be off and the transmitted signal may be too low to be useable at the medial ear canal assembly. Alternatively, or in addition, movements of, for example, the jaw of a user, may result in changes to the alignment caused by changes to the shape of the ear canal or position of the transmitting or receiving elements. It would, therefore, be advantageous to design a hearing aid system wherein alignment between components on the lateral ear canal assembly and components on the medial ear canal assembly had little or no effect on the strength of a signal received at the medial ear canal assembly. It would further be advantageous to design a hearing aid system wherein changes in the shape or structure of the ear canal resulting from, for example, movement of the user's jaw, would have little or no impact on the strength of a signal received at the medial ear canal assembly.

SUMMARY OF THE INVENTION

The present disclosure relates to improved contact hearing aid systems, apparatuses, and methods and more particularly to improved designs for such contact hearing aid systems and improved methods for transmitting energy and information between components of such systems.

BRIEF DESCRIPTION OF THE DRAWINGS

The foregoing and other objects, features and advantages of embodiments of the present inventive concepts will be apparent from the more particular description of preferred embodiments, as illustrated in the accompanying drawings in which like reference characters refer to the same or like elements. The drawings are not necessarily to scale, emphasis instead being placed upon illustrating the principles of the preferred embodiments.

DETAILED DESCRIPTION OF THE INVENTION

Figure 1:
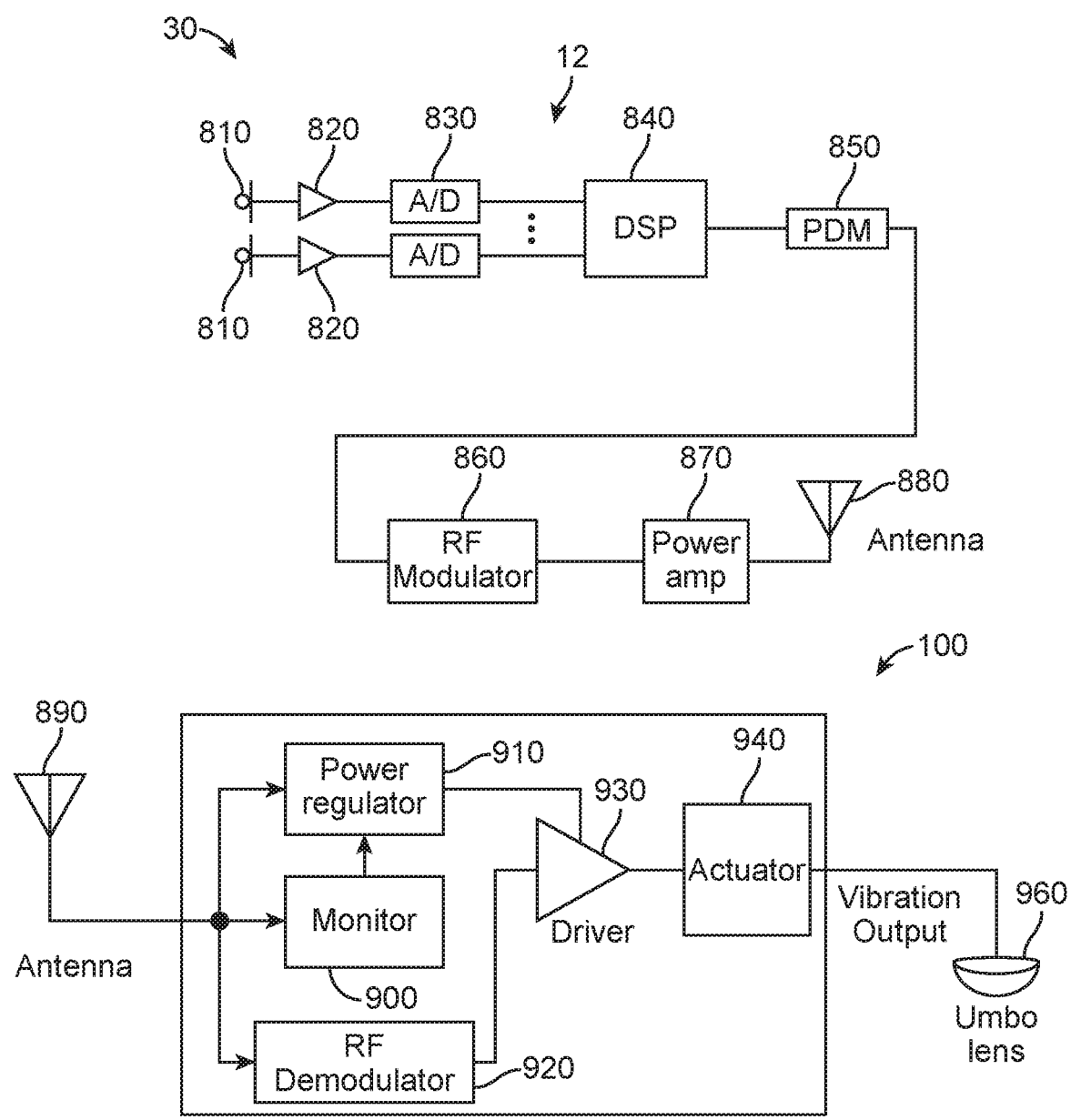
FIG. 1 is a block diagram of a smartlens system, including a lateral ear canal assembly and medial ear canal assembly according to one embodiment of the present invention.

FIG. 1 is a block diagram of a smartlens system 30 according to one embodiment of the present invention, including lateral ear canal assembly 12 (which may also be referred to as a light tip or eartip in some embodiments) and medial ear canal assembly 100 (which may also be referred to as a tympanic lens or tympanic lens transducer in some embodiments).

In the embodiment of FIG. 1, lateral ear canal assembly1 2 includes a plurality of microphones 810 which are connected through pre-amplifiers 820 to analog to digital (A to D) converters 830. Analog to digital converters 830 may be connected to digital signal processor 840. The output of digital signal processor 840 may be connected to a circuit for modulating the output, such as, for example, pulse density modulator 850. In the embodiment of the invention, the output of pulse density modulator 850 may be connected to radio frequency (RF) modulator 860. The output of RF modulator 860 may be connected to power amplifier 870 and the output of power amplifier 870 may be connected to antenna 880. In the embodiment illustrated, signals radiated from antenna 880 may be received by medial ear canal assembly 100.

In FIG. 1, medial ear canal assembly 100 may include antenna 890. The output of antenna 890 may be connected to monitor 900, Power regulator 910 and RF demodulator 920. The output of monitor 900 may be connected to power regulator 910. The output of power regulator 910 and RF demodulator 920 may be connected to driver 930. The output of driver 930 may be connected to actuator 940. The output of actuator 940 drives umbo lens 960, using, for example, a vibratory output.

Figure 2:
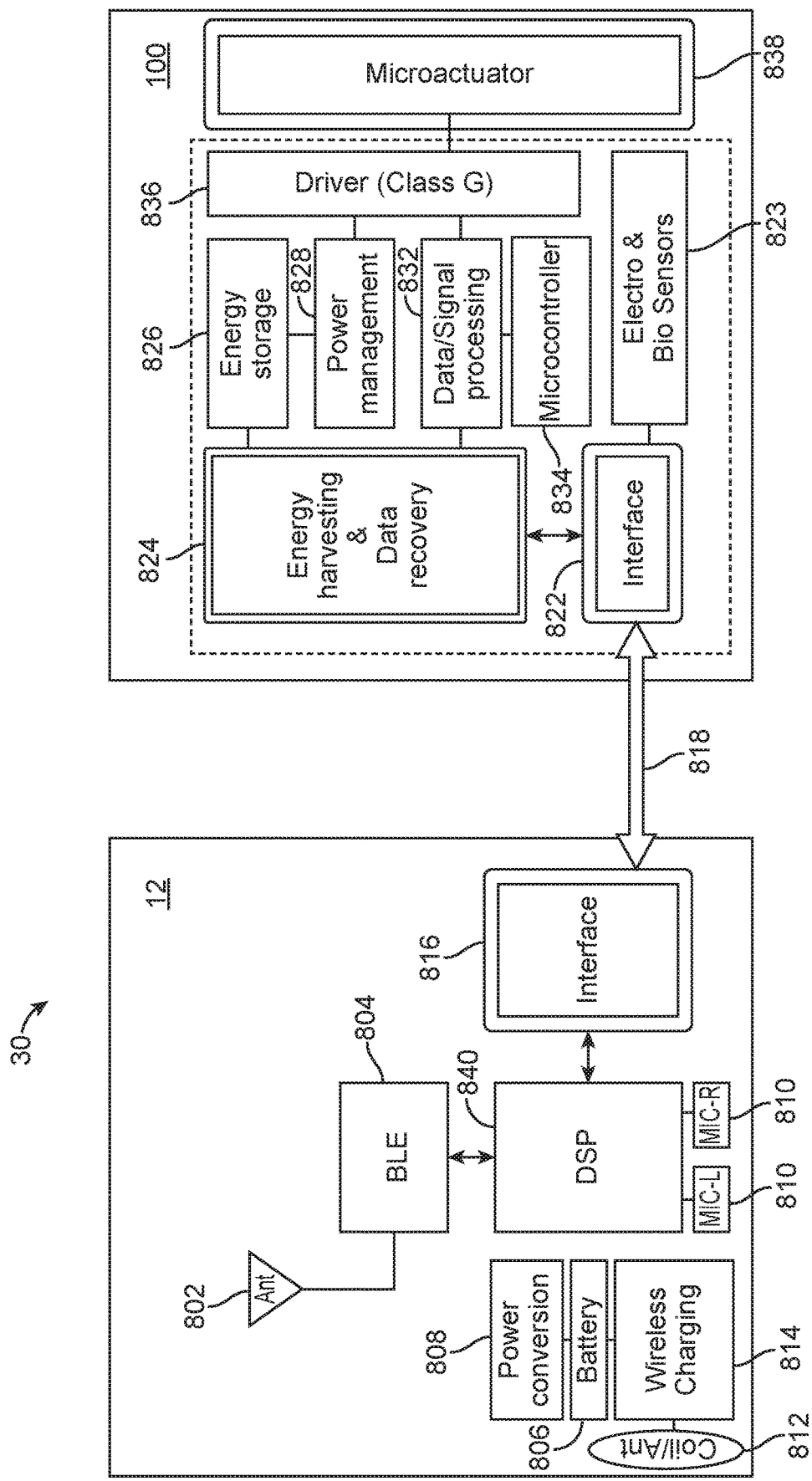
FIG. 2 is a block diagram of a smartlens system, including a lateral ear canal assembly and medial ear canal assembly according to one embodiment of the present invention.

FIG. 2 is a block diagram of a smartlens system 30, including a lateral ear canal assembly 12 (which may also be referred to as a processor) and medial ear canal assembly 100 according to one embodiment of the present invention. In FIG. 2, lateral ear canal assembly 12 may include an external antenna 802 adapted to send and receive signals from an external source such as a cell phone (see FIG. 3). External antenna 802 may be connected to a circuit for processing signals received from external antenna 802, such as blue tooth circuit 804, which, in some embodiments, may be a blue tooth low energy circuit. The output of Bluetooth circuit 804 may be connected to digital signal processor 840, which may also include inputs from microphones 810. Ear canal assembly 12 may further include battery 806 and power conversion circuit 808 along with charging antenna 812 (which may be a coil) and wireless charging circuit 814. Digital signal processor 840 may be connected to interface circuit 816, which may be used to transmit data and power from lateral ear canal assembly 12 to medial ear canal assembly 100. In embodiments of the invention, power and data may be transmitted between lateral ear canal assembly 12 and medial ear canal assembly 100 over power/data link 818 by any one of a number of mechanisms, including, radio frequency (RF), optical, inductive and cutaneous (through the skin) transmission of the data and power. Alternatively, separate modes of transmission may be used for the power and data signals, such as, for example, transmitting the power using radio frequency and the data using light.

In FIG. 2, power and data transmitted to medial ear canal assembly 100 may be received by interface circuit 822. Interface circuit 822 may be connected to energy harvesting and data recovery circuit 824 and to electrical and biological sensors 823. In FIG. 2, medial ear canal assembly 100 may further include energy storage circuitry 826, power management circuitry 828, data and signal processing circuitry 832 and microcontroller 834. Medial ear canal assembly 100 may further include a driver circuit 836 and a microactuator 838. In the illustrated embodiment, data transmitted from medial ear canal assembly 100 may be received by interface circuit 816 on lateral ear canal assembly 12.

Figure 3:
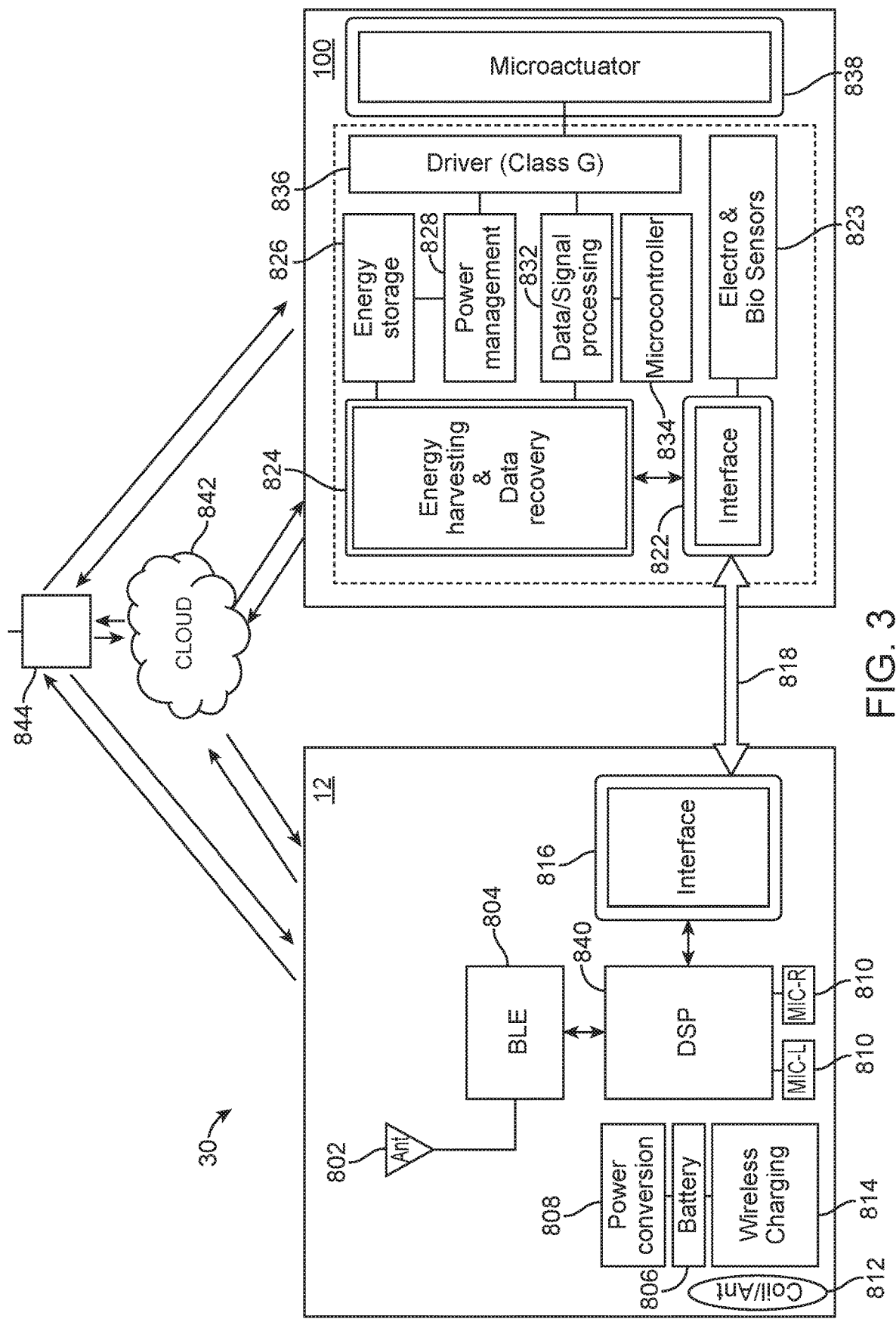
FIG. 3 is a block diagram of a smartlens system which is adapted for communication with external devices according to one embodiment of the present invention.

FIG. 3 is a block diagram of a smartlens system 30, adapted for communication with external devices according to one embodiment of the present invention. In FIG. 3, smartlens system 30, illustrated previously in FIG. 2 is adapted to communicate with external devices such as cell phone 844 or cloud computing services 842. Such communication may occur through external antenna 802 on lateral ear canal assembly 12 or, in some embodiments directly from medial ear canal assembly 100.

Figure 4:
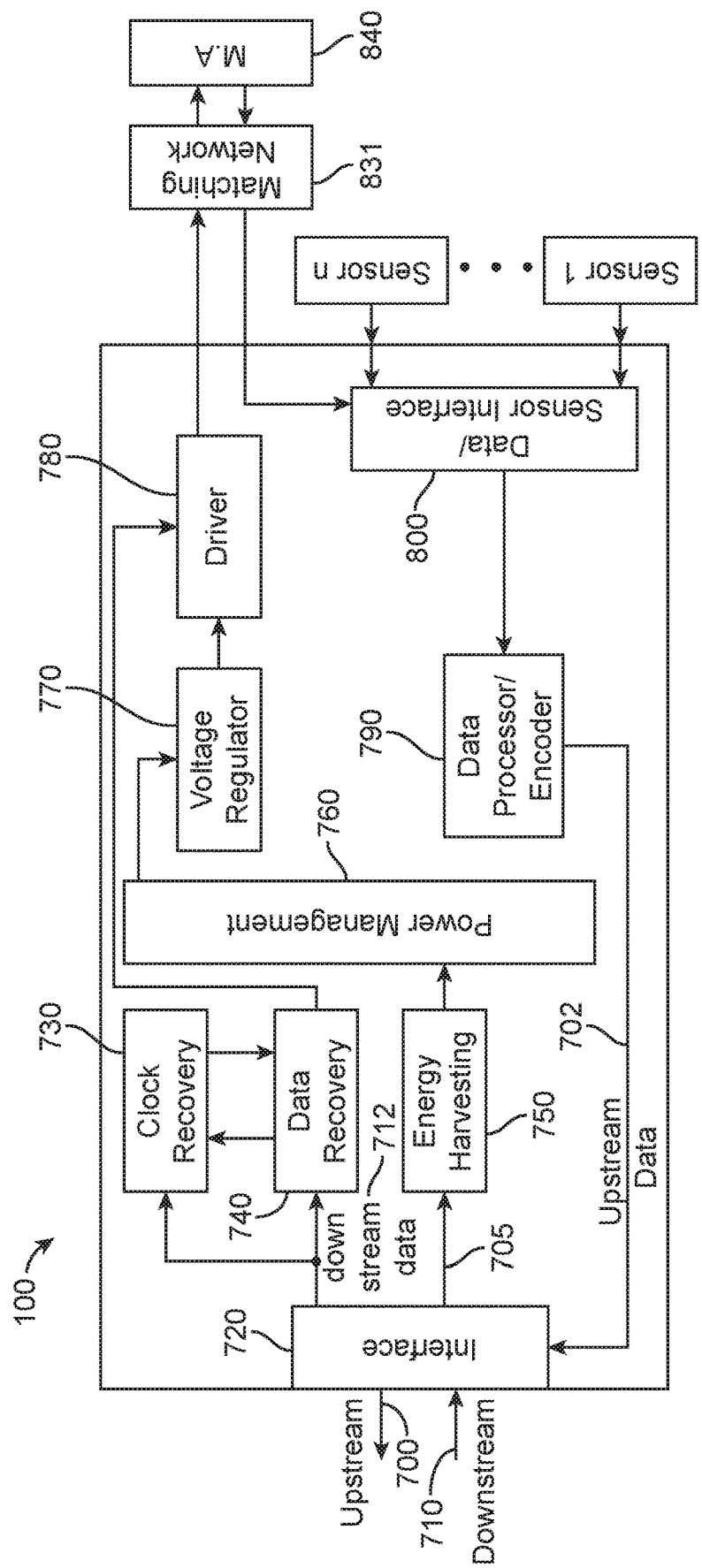
FIG. 4 is a block diagram of a medial ear canal assembly (which may also be referred to as a smart lens) according to one embodiment of the invention.

FIG. 4 is a block diagram of a medial ear canal assembly 100 according to an embodiment of the present invention. In FIG. 4, medial ear canal assembly 100 includes interface 720, clock recovery circuit 730, data recovery circuit 740 and energy harvesting circuit 750. In embodiments of the invention, interface 720 is adapted to transmit data from medial ear canal assembly 100 and to receive data transmitted to medial ear canal assembly 100. Interface 720 may be a radio frequency (RF) interface, an optical interface, an inductive interface or a cutaneous interface. Medial ear canal assembly 100 may further include power management circuit 760, voltage regulator 770, driver 780, data processor encoder 790 and data/sensor interface 800.

In FIG. 4, upstream data 702 collected from data processor/encoder 790 may be transmitted via interface 720 as a part of upstream signal 700. Downstream signal 710 may be transmitted to interface 720, which may extract the data portion and may distribute downstream data 712 to data recovery circuit 740 and clock recovery circuit 730. Interface 720 may further transmit at least a portion of downstream signal 705 to energy harvesting circuit 750. The output of energy harvesting circuit 750 may be transmitted to power management circuit 760, which may then distribute energy to voltage regulator 770. Voltage regulator 770 may distribute its output to driver 780, which may also receive input from data recovery circuit 740. The output of driver 780 may be sent through matching network 831 to drive, for example, microactuator 840.

Microactuator 840 may include sensors (not shown) which generate data about the function of microactuator 840. This data may be transmitted back to medial ear canal assembly 100 through matching network 831 and to data/sensor interface 800, which, in turn may transmit the sensor information to data processor/encoder 790, which generates upstream data 702. Data/sensor interface 800 may also receive information from other sensors (e.g., Sensor 1 to Sensor n in FIG. 4), which data is, in turn, transmitted to data processor/encoder 790 and becomes part of upstream data 702.

Figure 5:
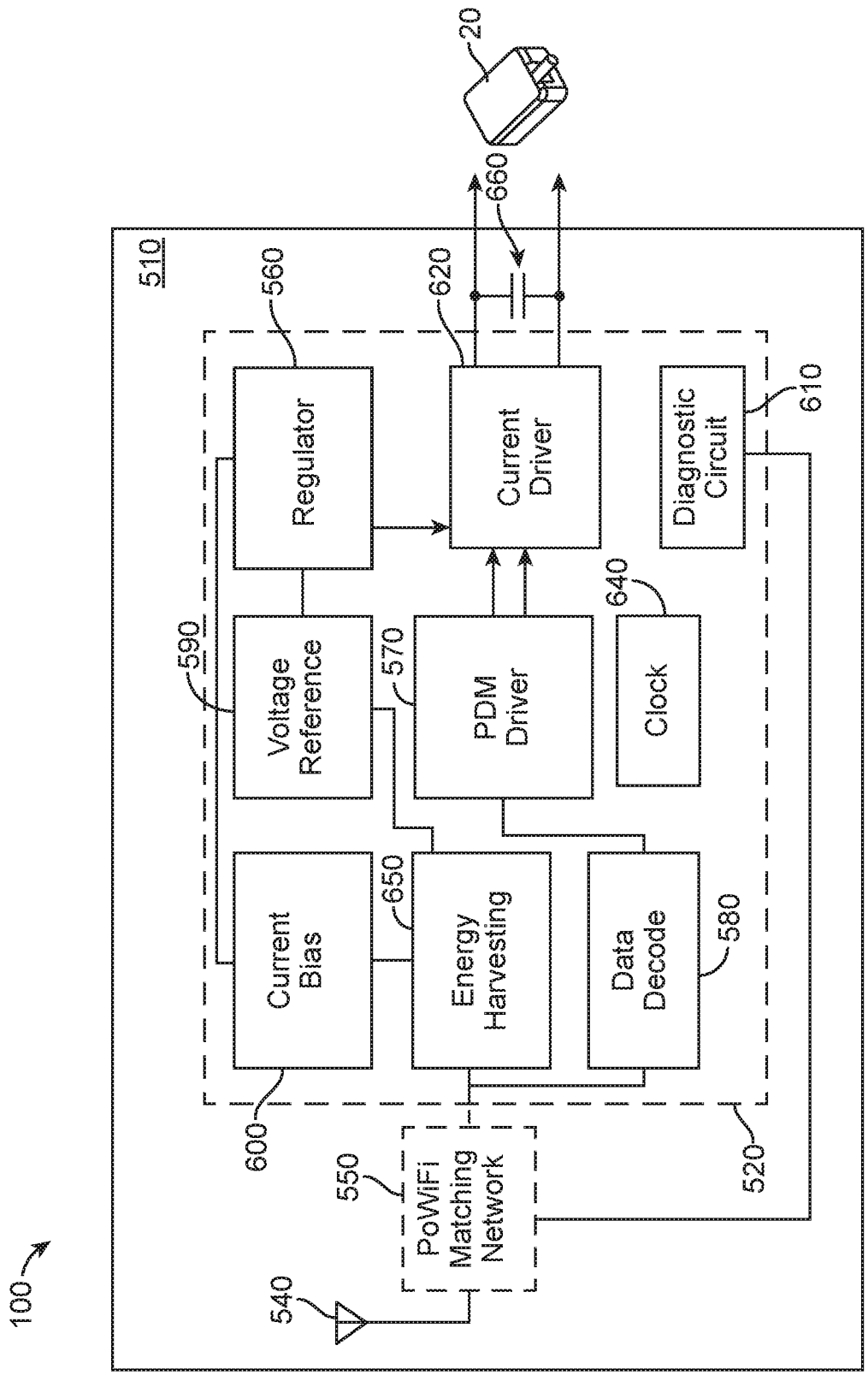
FIG. 5 is a further example of a medial ear canal assembly according to one embodiment of the present invention.

FIG. 5 is a further example of a medial ear canal assembly 100 according to one embodiment of the present invention. In FIG. 5, a circuit 510 (which may be a hybrid circuit) may be positioned on medial ear canal assembly 100. Hybrid circuit 510 may include smart chip 520, antenna 540, matching network 550 and capacitor 660. Smart chip 520 may include current bias circuitry 600, voltage reference circuit 590, regulator 560 (which may be, for example, a Class-G H-Bridge regulator), energy harvesting circuit 650, driver 570 (which may be, for example, a Pulse Density Modulation (PDM) driver), current driver 620 (which may be a Class-G H-Bridge current driver), data decoder 580, clock 640 and diagnostic circuit 610. In the illustrated embodiment, regulator 560 may be, for example, a Class G H-Bridge Regulator which may be a push-pull positive negative driver with a zero bias. Using a regulator with a zero bias may reduce energy consumption by a factor of 10 or more when compared to prior contact hearing aid systems which used light to transmit the power and information.

In the embodiment of FIG. 5, antenna 540 may be adapted to receive RF signals, inductively coupled signals or cutaneously transmitted signals. Signals received by antenna 540 may include a power component and/or a data component. Antenna 540 may also be used to transmit data from medial ear canal assembly 100 to an external device, such as, for example, a lateral ear canal assembly 12. In the illustrated embodiment, matching network 550 provides matching between antenna 540 and smart chip 520. Driver 570 may control the gain applied to the incoming signal, ensuring that the output of microactuator is uniform for a given input. The gain applied to a given signal will be a function of the gain required by the user of the device. Amplified signals from current driver 620 are passed through a matching network, such as, for example, capacitor 660, to transducer assembly 20 (which may be, for example, a microactuator, such as, for example, a balanced armature transducer), which may be used to vibrate the tympanic membrane of a user.

In the embodiment illustrated in FIG. 5, data decoder 580 decodes and confirms the validity of data received by antenna 540, performing functions such as error correction and data verification. In embodiments of the invention, particularly those using RF, inductive and/or cutaneously coupled data transmission, interference from external sources could be a problem and it is important to ensure that only verified data is used by the system. In light based systems, interference is of less concern since the light is confined to the ear canal where it was not subject to interference from other light sources. In embodiments of the invention, voltage reference circuit 590 and Current bias circuit 600 provide the appropriate voltage and current to drive transducer assembly 20. In embodiments of the invention, diagnostic circuit 610 gathers data from sensors located on or connected to medial ear canal assembly 100 to transmit that data back to lateral ear canal assembly 12. In embodiments of the invention, current driver 620 supplies the current necessary to drive transducer assembly 100. In embodiments of the invention, clock 640 supplies clock signals to the digital components on medial ear canal assembly 100.

In embodiments of the invention, energy harvest circuit 650 harvests energy for use by the components of medial ear canal assembly 100. Energy harvest circuit 650 may harvest energy from the signals received by antenna 540 and/or from environmental energy sources, which environmental energy sources may include, for example, movement of the person wearing medial ear canal assembly 100 and/or movement of body parts, including the wearer's mouth. In embodiments of the invention, capacitor 660 provides a matching network between current driver 620 and transducer assembly 20.

Figure 6:
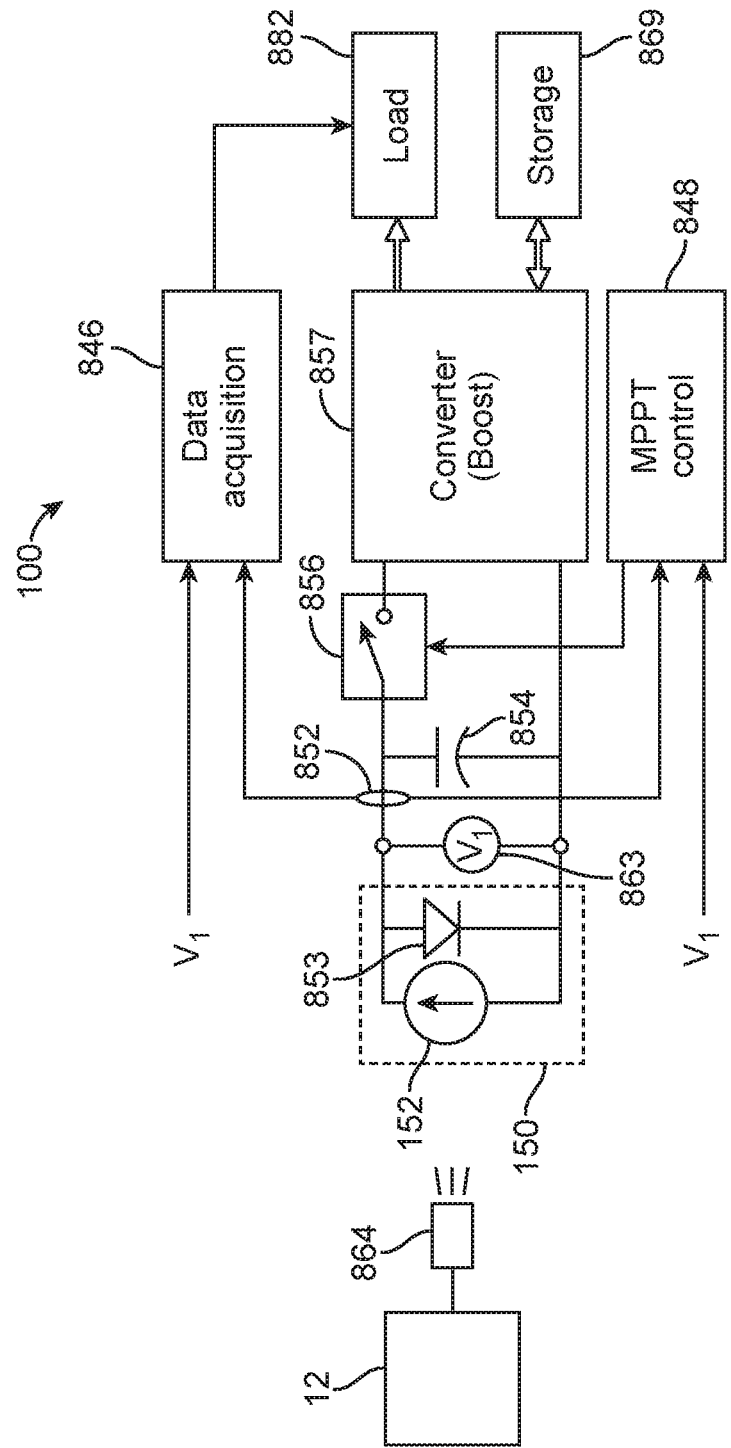
FIG. 6 is a block diagram of an optically coupled lateral and medial ear canal assembly according to one embodiment of the present invention.

FIG. 6 is a block diagram of an optically coupled medial ear canal assembly 100 and lateral ear canal assembly 12 according to one embodiment of the present invention. In FIG. 6, photo detector 150 may receive optical input signals from laser 864 on lateral ear canal assembly 12. The received signals result in an output voltage Vi, which is measured at the output of photodetector 150 and may be relayed to data acquisition circuit 846 and maximum power point tracking ("MPPT") control circuit 848. Data acquisition circuit 846 and MPPT control circuit 848 may also receive the measured current at the output of photodetector 150 from current sensor 852. In the illustrated embodiment, photo detector 150 may be modeled as current source 152 and parasitic diode 853. In the illustrated embodiment, capacitor 854 may be connected across the output of photodetector 150. In FIG. 6, switch 856 may be positioned between the output of photodetector 150 and the input of converter 857. The output of converter 857 may be connected to load 882 and to storage device 869. Storage device 869 may be, for example, a rechargeable battery.

In FIG. 6, switch 856 controls the connection of converter 857 to the output of photodetector 150. Switch 856 is controlled by the output of MPPT control circuit 848. Converter 857 supplies energy to and receives energy from storage device 869, which may be, for example, a rechargeable battery. Data acquisition circuit 846 and converter circuit 857 drive load 882, with data acquisition circuit 847 proving load 882 with control data (e.g. sound wave information) and converter 857 providing load 882 with power. The power provided by converter 857 is used to drive load 882 in accordance with the control data from data acquisition circuit 846. Load 882 may, in some embodiments of the invention, be a transducer assembly, such as, for example, a balanced armature transducer.

Figure 7:
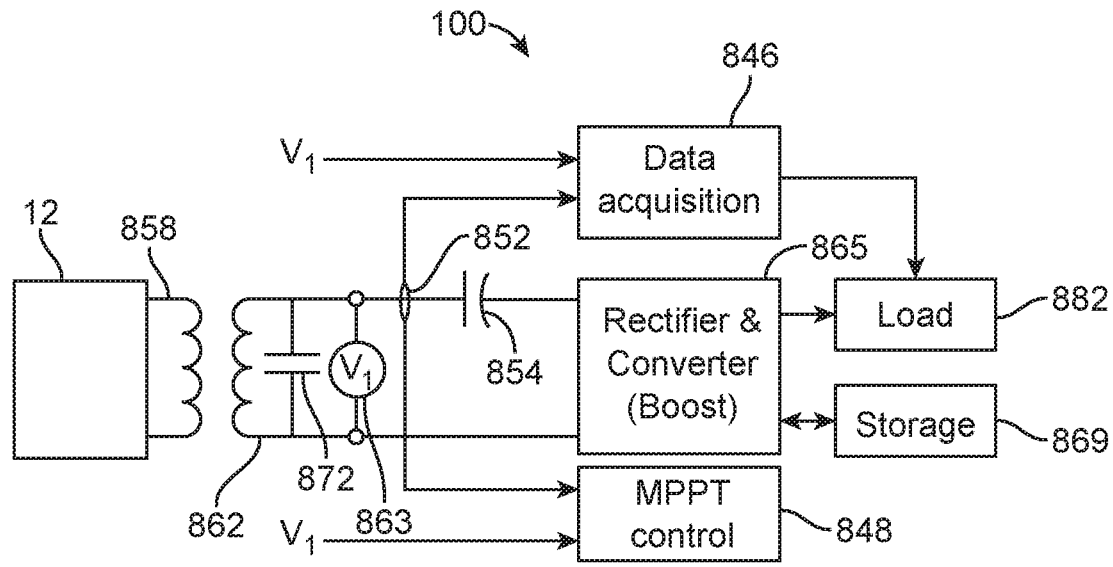
FIG. 7 is a block diagram of an inductively coupled medial ear canal assembly according to one embodiment of the present invention.

FIG. 7 is a block diagram of an inductively coupled medial ear canal assembly 100 and lateral ear canal assembly 12 according to one embodiment of the present invention. In FIG. 7, the output of lateral ear canal assembly 12 may be inductively coupled through coil 858 to coil 862 on medial ear canal assembly 100. The inductive coupling may induce a current in coil 862 on medial ear canal assembly 100. The inductively induced current may be measured by current sensor 852. The inductive coupling may further induce an output voltage $V_1$ across coil 862 which may be measured by a voltage meter 863. The measured current and voltage may be used by MPPT control 848 and data acquisition circuit 846. The output of coil 862 may be further connected to a rectifier and converter circuit 865 through capacitor 854. In embodiments of the invention, coil 862 may be connected directly to rectifier and converter circuit 865 (eliminating capacitor 854). In FIG. 7, capacitor 854 may be positioned between the output of coil 862, which may include capacitor 872, and the input of rectifier and converter circuit 865. The output of rectifier and converter circuit 865 may be connected to load 882 and to storage device 869. In embodiments of the invention, rectifier and converter circuitry 865 may include circuitry which provides power to storage device 869 and transmits power from storage device 869 to load 882 when required. In embodiments of the invention, storage device 869 may be connected directly to coil 862 or to other circuity adapted to harvest energy from coil 862 and deliver energy to load 882. Load 882 may be, for example, a microactuator positioned on the medial ear canal assembly 100 such that load 882 vibrates the tympanic membrane of a user when stimulated by signals received by coil 862. Storage device 869 may be, for example, a rechargeable battery.

In embodiments of the invention: coil 858 may comprise a transmit coil and coal 862 may comprise a receive coil; coils 858 and 862 may be elongated coils manufactured from a conductive material; coils 854 and 862 may be stacked coils; coils 854 and 862 may be wound inductors; coils 854 and 862 may be wound around a central core; coils 854 and 862 may be wound around a core comprising air; coils 854 and 862 may be wound around a magnetic core; coils 854 and 862 may have a substantially fixed diameter along the length of the wound coil.

In embodiments of the invention: rectifier and converter circuit 865 may comprise power control circuitry; rectifier and converter circuit 865 may comprise a rectifier; rectifier and converter 865 may be a rectifying circuit, including, for example, a diode circuit, a half wave rectifier or a full wave rectifier; rectifier and converter circuit 865 may comprise a diode circuit and capacitor.

In embodiments of the invention, energy storage device 869 may be a capacitor, a rechargeable battery or any other electronic element or device which is adapted to store electrical energy.

In FIG. 7, the output of MPPT control circuit 848 may control rectifier and converter circuit 865. Rectifier and converter circuit 865 may supply energy to and receive energy from storage device 869, which may be, for example, a rechargeable battery. Data acquisition circuit 846 and rectifier and converter circuit 865 may be used to drive load 882, with data acquisition circuit 846 proving load 882 with control data (e.g., sound wave information) and rectifier and converter circuit 865 providing load 882 with power. In embodiments of the invention, rectifier and converter circuit 865 may be used to drive load 862 directly, without information from a data circuit such as data acquisition circuit 846. In embodiments of the invention rectifier and converter circuit 865 may be used to drive load 862 directly without energy from storage device 869. The power provided by rectifier and converter circuit 865 is used to drive load 882 in accordance with the control data from data acquisition circuit 846. Load 882 may, in some embodiments of the invention, be a transducer assembly, such as, for example, a balanced armature transducer.

In embodiments of the invention, information and/or power may be transmitted from lateral ear canal assembly 12 to medial ear canal assembly 100 by magnetically coupling coil 858 to coil 862. When the coils are inductively coupled, the magnetic flux generated by coil 858 may be used to generate an electrical current in coil 862. When the coils are inductively coupled, the magnetic flux generated by coil 858 may be used to generate an electrical voltage across coil 862. In embodiments of the invention, the signal used to excite coil 858 on lateral ear canal assembly 12 may be a push/pull signal. In embodiments of the invention, the signal used to excite coil 858 may have a zero crossing. In embodiments of the invention, the magnetic flux generated by coil 858 travels through a pathway that includes a direct air pathway that is not obstructed by bodily components. In embodiments of the invention, the direct air pathway is through air in the ear canal of a user. In embodiments of the invention, the direct air pathway is line of sight between lateral ear canal assembly 12 and medial ear canal assembly 100 such that medial ear canal assembly 100 is optically visible from lateral ear canal assembly 100.

In embodiments of the invention, the output signal generated at coil 862 may be rectified by, for example, rectifier and converter circuit 865. In embodiments of the invention, a rectified signal may be used to drive a load, such as load 882 positioned on medial ear canal assembly 100. In embodiments of the invention, the output signal generated at coil 862 may contain an information/data portion which includes information transmitted to medial ear canal assembly 100 by coil 858. In embodiments of the invention, at least a portion of the output signal generated at coil 862 may contain energy or power which may be scavenged by circuits on medial ear canal assembly 100 to charge, for example, storage device 869.

In embodiments of the invention, wherein inductive coupling is used in the transmission of data and/or power between components of a hearing aid, advantages of inductive coupling over other mechanisms of energy/data transfer may include: a reduced sensitivity to directionality and motion of the hearing aid; a reduced sensitivity to relative positioning of the components of the hearing aid; a reduced sensitivity to the relative motion of components of the hearing aid; improved user comfort, particularly with respect to components of the hearing aid positioned in the ear canal of the user; extended battery life; and a reduced sensitivity to bodily fluids (e.g. cerumen) present in the ear canal of a patient.

Figure 8:
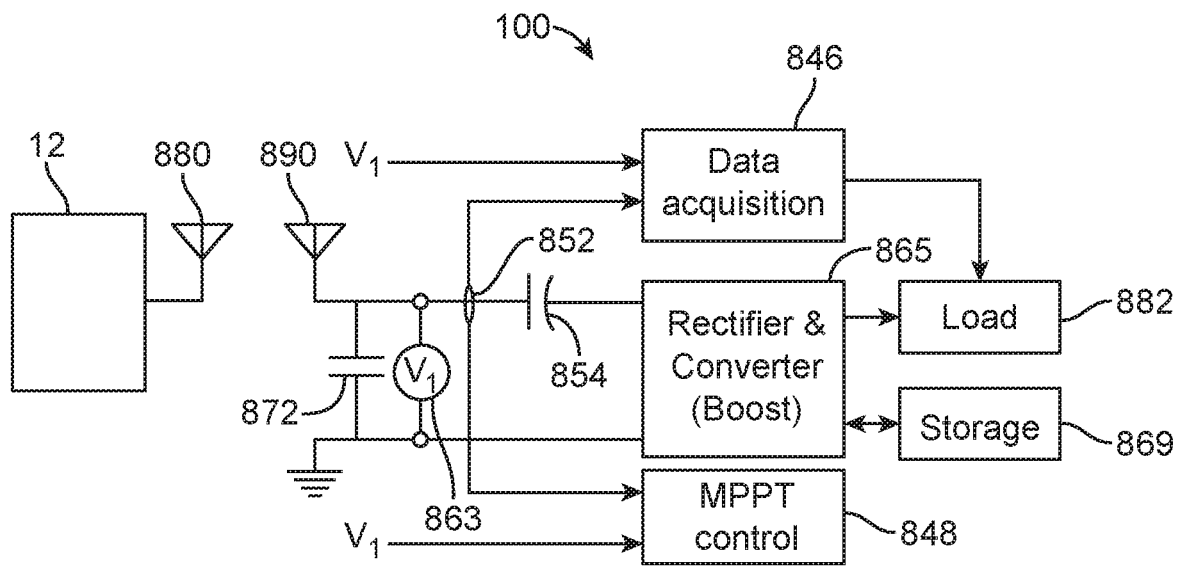
FIG. 8 is a circuit diagram of an RF smartlens system according to the present invention.

FIG. 8 is a circuit diagram of an RF smartlens system according to the present invention. In FIG. 8, the output of lateral ear canal assembly 12 may be coupled through antenna 880 to antenna 890 on medial ear canal assembly 100. The RF coupling induces a current in antenna 890, which may be measured by current sensor 852 and further induces an output voltage $V_1$ which may be measured by voltage sensor 863. The measured current and voltage $V_1$ are used by MPPT control 848 and data acquisition circuit 846. The output of antenna 890 may be connected to a rectifier and converter circuit 865 through capacitor 854. In FIG. 8, capacitor 854 may be positioned between the output of antenna 890, which may include capacitor 872 and the input of rectifier and converter circuit 865. The output of rectifier and converter circuit 865 may be connected to load 882 and to storage device 869. Load 882 may, in some embodiments of the invention, be a transducer assembly, such as, for example, a balanced armature transducer. Storage device 869 may be, for example, a rechargeable battery.

In FIG. 8, the output of MPPT control circuit 848 may control rectifier and converter circuit 865. Rectifier and converter circuit 865 may be used to supply energy to and receive energy from storage device 869, which may be, for example, a rechargeable battery. Data acquisition circuit 846 and rectifier and converter circuit 865 may be used to drive load 882, with data acquisition circuit 846 proving load 882 with control data (e.g., sound wave information) and rectifier and converter circuit 865 providing load 882 with power. The power provided by rectifier and converter circuit 865 may be used to drive load 882 in accordance with the control data from data acquisition circuit 846. Load 882 may, in some embodiments of the invention, be a transducer assembly, such as, for example, a balanced armature transducer.

Figure 9:
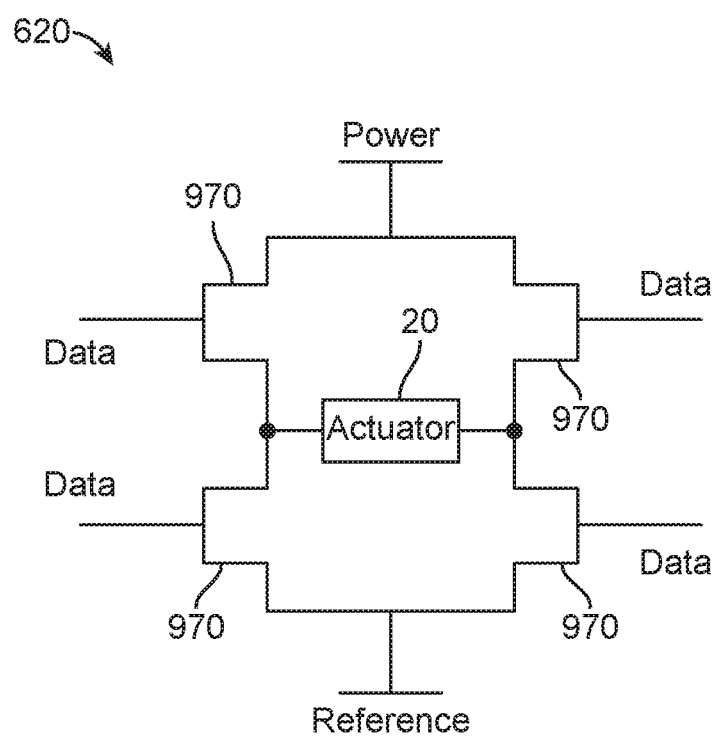
FIG. 9 is a circuit diagram of a current driver driving a transducer assembly which may be used in embodiments of the present invention.

FIG. 9 is a circuit diagram of an H Bridge current driver 620 driving transducer assembly 20 which may be used in embodiments of the present invention. FIG. 9 illustrates a current driver 620 which may be used in one embodiment of the invention. In FIG. 9, the actuator driver is a full bridge, which may be, for example, an H class amplifier. In this embodiment, the bridge consists of two legs (or half bridge—left and right). Each leg is totem pole of two MOSFET transistors 970.

In embodiments of the invention, the data fed into the actuator driver is typically binary patterns with pulse wave modulation (PWM) timing. In these embodiments, the voltage across the actuator is based on the PWM pattern. In embodiments of the invention, the H class topology uses a variable bias of the bridge based on the audio level.

Figure 10:
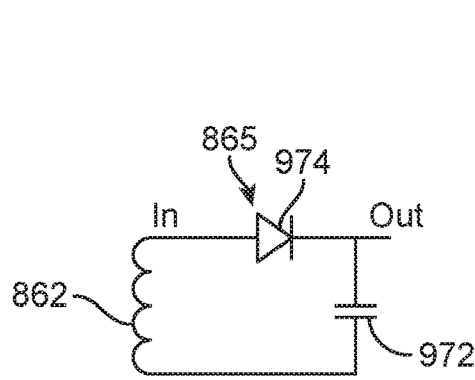
FIG. 10 is a diagram of a rectifier and converter circuit according to one embodiment of the present invention.

FIG. 10 is a diagram of a rectifier and converter circuit according to one embodiment of the present invention. In FIG. 10, rectifier and converter circuit 865 may include diode 974 and capacitor 972. In embodiments of the invention, the input to rectifier and converter circuit 865 may be connected directly to coil 862. In embodiments of the invention, the output of rectifier and converter circuit 865 may be coupled directly to a load, such as, for example, a transducer or a balanced armature transducer. In embodiments of the invention, the output of rectifier and converter circuit 865 may be coupled to the windings in a load, such as, for example, a transducer or a balanced armature transducer.

Figure 11:
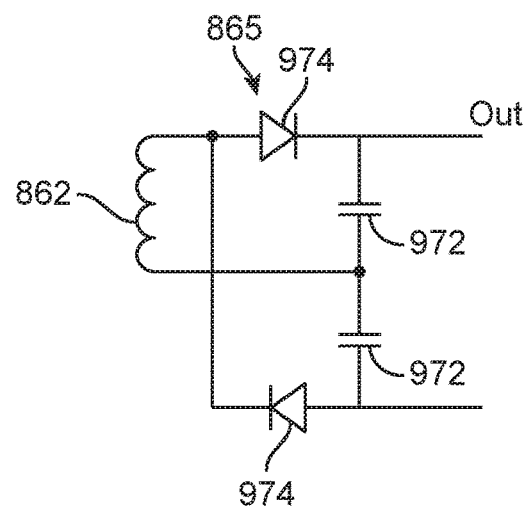
FIG. 11 is a diagram of a rectifier and converter circuit according to one embodiment of the present invention.
Figure 12:
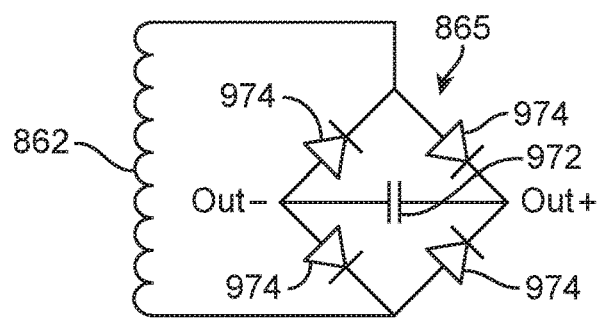
FIG. 12 is a diagram of a rectifier and converter circuit according to one embodiment of the present invention.

FIG. 11 is a diagram of a rectifier and converter circuit according to one embodiment of the present invention. FIG. 12 is a diagram of a rectifier and converter circuit according to one embodiment of the present invention. In embodiments of the invention, rectifier and converter circuit 865 may include diodes 974 and capacitors 972 which may form, for example, bridge circuits such as, for example, half wave bridges or full wave bridges.

Figure 13:
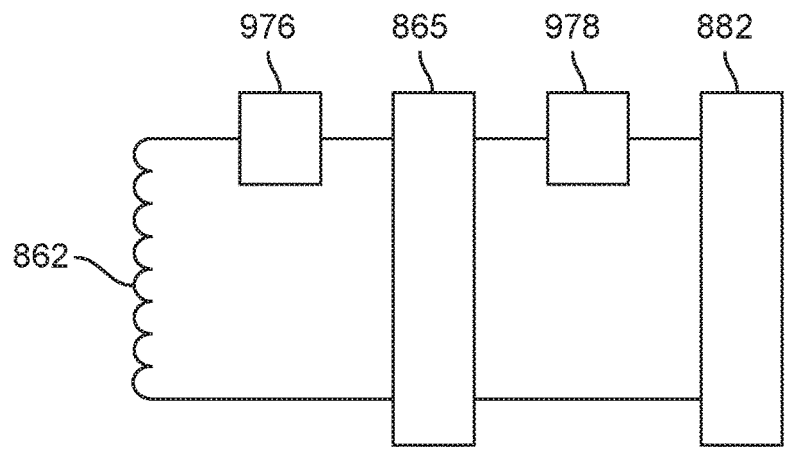
FIG. 13 is a diagram of a portion of a medial ear canal assembly according to one or more embodiments of the present invention.

FIG. 13 is a diagram of a portion of a medial ear canal assembly according to one or more embodiments of the present invention. In embodiments of the invention, the input to rectifier and converter circuit 862 may be connected to coil 862 through additional circuitry, such as, for example, capacitor 854 or input circuitry 976. In embodiments of the invention, the output of rectifier and converter circuit 865 may be coupled to a load, such as, for example, a transducer or a balanced armature transducer through an output circuit 978. In embodiments of the invention, output circuit 978 may be, for example, a capacitor, an inductor, a combination of electrical or electronic components and/or a matching circuit.

In embodiments of the invention, the lateral ear canal assembly may use, for example, energy which is transmitted using RF transmission, inductive coupling and/or cutaneous transmission to transmit data and/or power to the medial ear canal assembly. The use of RF transmission or inductively coupled energy to transmit the data and/or power is beneficial because it eliminates the need to bias the signal before it is transmitted, reducing the amount of energy required to transmit a given signal and eliminating the need to use a sliding bias to reduce the amount of energy required to be transmitted. The use of RF or inductive coupled mechanisms for transmitting the data and power signals without biasing the signal, where the transmitted signal inudes both a positive and a negative component may be referred to as a Push/Pull driving strategy.

In embodiments of the invention, a Push/Pull driving strategy means that the output of the lateral ear canal assembly can have both positive and negative components (unlike an optical drive, which can only go positive and therefore, needs to incorporate negative information into a positive signal), allowing the system to transmit both positive and negative data (e.g., sound wave information) without using a bias or offset signal. Thus, using a push/pull driving strategy, it is only necessary to deliver enough energy to: i) transmit the data; ii) power the medial canal assembly circuitry, including any sensors; and iii) activate the microactuator. This is advantageous because the system is only using energy when it is necessary and eliminating the need for a bias signal and the need for sliding bias to minimize the bias signal.

In embodiments of the invention, no bias is required and the signal may be transmitted directly, resulting in reduced energy consumption and an increased battery life.

By using smart lens circuitry on the medial ear canal assembly, power for operating the elements of the medial ear canal assembly may be harvested from the transmitted signal and stored on the medial ear canal assembly until needed (e.g., in a rechargeable battery or supercapacitor). The harvested power may be used to drive the medial ear canal assembly electronics (e.g., the smart chip logic and/or sensors on the medical ear canal assembly) in addition to providing power for the transducer assembly which provides vibratory input to the tympanic lens. This harvested power from the incoming signal may, in some embodiments, be supplemented or replaced by power harvested directly from the wearer, e.g., through harvesting the energy generated by the motion of the wearer's body, such as, for example, the motion of the wearer's jaw when chewing or talking or the heat generated by the wearer.

In embodiments of the present invention, the output of the medial ear canal assembly is regulated directly by the circuitry on the medial ear canal assembly such that the output is not a function of the power or intensity of the incoming signal from the lateral ear canal assembly, which intensity may fluctuate as, for example, a function of the distance between the medial ear canal assembly and the lateral ear canal assembly. For example, in these embodiments, loudness, as perceived by the wearer, will not be a function of the distance between the lateral and medial ear canal assemblies. Nor will it be a function of the intensity of the signal transmitted by the lateral ear canal assembly to the medial ear canal assembly, although the signal will have to be intense enough to reach a threshold value. Once the threshold value is reached, the medial ear canal assembly will be receiving a signal which is strong enough to provide sufficient power to the medial ear canal assembly to both power the assembly and transmit the information (e.g., sound signals) carried by the received signal. As long as the input reaches and remains above that threshold value, the patient will not perceive any changes resulting from fluctuations in the intensity of the input signal resulting from, for example, fluctuations in the distance between the medial and lateral ear canal assembly. In these embodiments, the output of the medial ear canal assembly may be regulated by circuitry on the medial ear canal assembly, rather than, for example, the intensity of the incoming signal.

In embodiments of the invention, the medial ear canal assembly may be adapted to include an energy storage system (e.g., a rechargeable battery or capacitor) to collect energy received from the incoming signal and store it for use at a later time (e.g., when the incoming signal drops below the threshold value). In these embodiments, once the energy storage system is charged to a predetermined level, the level of incoming signal required to run the medial ear canal assembly is reduced since the power from the incoming signal may be supplemented by the stored energy. In such embodiments, the threshold level may be reduced to the minimum level required to transmit the information in the input signal.

In embodiments of the invention, the information signal (e.g., the signal representative of the sound received by microphones on the processor and/or the lateral ear canal assembly) is separated from the energy source after the incoming signal is received by the medial ear canal assembly and prior to driving the output of the lateral ear canal assembly. In other embodiments of the invention, the incoming signal to the medial ear canal assembly comprises only a data signal with the medial ear canal assembly being powered by energy stored on the medial ear canal assembly (e.g., in a rechargeable battery or capacitor) or scavenged from the local environment (e.g., from movements of the user's jaw muscles which move the tissue in the ear canal). In embodiments of the invention, where the input signal reaches the threshold level necessary to create user perceptible sound, the power in the incident signal received by the medial ear canal assembly may be used directly to drive the output of the medial ear canal assembly. Once the input signal exceeds the threshold level, at least a portion of the received power may be stored in a storage device on the medial ear canal assembly (e.g., a battery), the stored power may thereafter be used to provide power to components of the medial ear canal assembly, allowing the medial ear canal assembly to operate even when the input level drops below the threshold level.

In embodiments of the invention, the output of the medial ear canal assembly is a transducer assembly coupled to the patient's tympanic membrane. With the power separated from the data, the medial ear canal assembly requires only a minimum data signal to provide an output (e.g., a vibratory output) to the tympanic membrane. Once a minimum input signal level is reached, the vibratory output may be regulated to the appropriate levels regardless of the magnitude of the input signals, particularly where the power signal has been harvested and/or stored by the medial ear canal assembly.

Energy harvesting in addition to or instead of getting energy directly from an outside source, such as, a lateral ear canal assembly 12, may reduce the need for a lateral ear canal assembly. Energy harvested could be used to provide power while very little energy would be required to transmit the data. In such a device, the data may be transmitted from outside the user's head, using, for example, RF, inductive coupled or cutaneous transmission mechanisms.

In embodiments of the invention, the lateral ear canal assembly may be designed to harvest power from the input signal before the acoustic data is transmitted to the load (e.g. the microactuator). This harvested power may be put into a reservoir, such as a battery. The stored power may then be modulated by the incoming acoustic data to drive the output of the medial ear canal assembly, e.g., to drive the microactuator coupled to the tympanic membrane of the user. Control of the power also makes it possible to limit the maximum range of vibration, protecting the user's hearing.

In embodiments of the invention, the lateral ear canal assembly may include a Wi-Fi power harvesting circuit which may be uses to harvest power from Wi-Fi signals received by the lateral ear canal assembly. The harvested Wi-Fi signals may be used to power circuitry on the lateral ear canal assembly. The harvested Wi-Fi signals may also be used to provide power to energy storage devices, such as rechargeable batteries, located on the lateral ear canal assembly. The stored energy may be used to power the lateral ear canal assembly and to transmit signals, including data and power components, to the medial ear canal assembly.

In embodiments of the invention, gain may be controlled on the medial ear canal assembly, ensuring that the gain is not subject to fluctuation resulting from, for example, fluctuations in the input signal level. The gain may be optimized for each patient by transmitting patient specific gain profiles to the medial ear canal assembly as part of the data transmitted from the lateral ear canal assembly. Such patent specific gain profiles may then be used to determine the amount of gain to be applied to the incoming signal from the lateral ear canal assembly, depending, for example, on the strength of the signal received from the medial ear canal assembly. Such patient specific gain profile may further be stored on the medial ear canal assembly and used whenever a signal is received to match the gain applied to the actual needs of the patient. The application of the patient specific gain at the medial ear canal assembly is beneficial because it allows the medial ear canal assembly to compensate for losses or changing circumstances in the transmission path through the ear canal which may be caused by, for example, changes in the head position of the user or movement of the user's jaw. The signal reaching the patient's tympanic membrane will, therefore, more accurately reflect the gain requirements of that patient. The gain may also be modified in real time by sending modification data from the lateral ear canal assembly to reflect, for example, the surroundings of the patient and/or the geographic location of the patient, such as, for example, increasing gain when the patient is in a noisy environment.

In embodiments of the invention, wherein a microactuator located on the medial ear canal assembly uses a drive post and/or umbo platform to directly drive the tympanic membrane of a user, changes in drive post location can be compensated automatically (e.g., by looking for changes to back EMF measured at, for example, the input to the microactuator). Such back EMF may be reflective of, for example, generator effects resulting from movement of the reed. In embodiments of the invention where back EMF can be measured and such back EMF is reflective of the movement of the drive post, such measurements may eliminate the need for regular checkups with physicians. Such changes in back EMF may be indicative of, for example, changes in the positon or location of the medial ear canal assembly. In embodiments of the invention, notifications of changes in back EMF may be sent to a server through a cell phone and from there to a physician who can then determine whether to ask the patient to come in to have the position or location of the medial ear canal assembly checked.

The described embodiments allow data collected by the medial ear canal apparatus to be transmitted back to a receiver, such as a lateral ear canal apparatus, where the data can be analyzed and, where appropriate, transmitted back to a second device, such as a BTE, a cell phone or directly to a cloud based computer. The type of data collected may include biometric data relating to the person wearing the device and/or data relating to the function of the apparatus or components of the apparatus.

In embodiments of the present invention, sensors on the medial ear canal assembly may be used to gather data, including, for example, biometric data, which may then be transmitted from the medial ear canal assembly to a suitable receiving device, such as a lateral ear canal assembly, a BTE, a cell phone or some combination of devices. Combinations of the preceding devices may also be used to receive and process data from the medial ear canal assembly, for example, data may be transmitted from the medial ear canal assembly to a lateral ear canal assembly, which may then transmit the received data to a BTE which processes the data and, where appropriate, transmits the processed data to the wearer's cell phone. The data may then be displayed on the cell phone and/or transmitted by the cell phone to, for example, the wearer's physician or a central data base.

Sensors on the medial ear canal assembly may be used to measure many parameters, including parameters related to physiological or characteristics of the wearer and/or operating parameters of the system. For example, the sensors may measure lens functionality, automatically regulating power levels. Further, the system may include communication channels to send measurements and/or data back to the lateral ear canal assembly, BTE processor and/or, to a remote device, such as a cell phone, or a remote data system, such as, for example, cloud storage. As further examples, the sensors may be adapted to measure power consumption, and/or back EMF, enabling the system to perform self-diagnostics.

In embodiments of the invention, a smartlens system may include a lateral ear canal assembly and a medial ear canal assembly, the medial ear canal assembly may include: a receiver adapted to receive a signal which includes a power component and a data component, wherein the data component includes sound data; power harvesting circuitry being connected to the receiver and adapted to harvest the power from the received signal; power storage circuitry connected to the power harvesting circuitry and adapted to receive power from the power harvesting circuitry, wherein the power storage circuitry is adapted to store the harvested power; and an actuator connected to the receiver and the power storage circuitry, wherein the output of the actuator is driven in accordance with saved data derived from the data component. In further embodiments of the invention, the sound data uses harvested power from the power storage circuit. In further embodiments of the invention, the power storage circuitry is selected from the group comprising: a rechargeable battery and a capacitor. In further embodiments of the invention, the actuator is a transducer. In further embodiments of the invention, the actuator is a balanced armature transducer.

In embodiments of the invention, a smartlens system may include a lateral ear canal assembly and a medial ear canal assembly, the medial ear canal assembly may include: a transceiver adapted to receive a signal which includes a power component and a data component; data control circuitry connected to the transceiver and adapted to manage data from the signals received by the medial ear canal assembly wherein such data control circuitry includes data storage; control circuitry for driving an output transducer positioned on the medial ear canal assembly; and gain control circuitry responsive to the data for managing the gain applied to signals driving the transducer. In further embodiments of the invention, the medial ear canal assembly may include power control circuitry connected to the transceiver adapted to harvest energy from the signals received by the medial ear canal assembly. In further embodiments of the invention, the stored data includes data specific to the hearing characteristics of a specific user. In further embodiments of the invention, the stored data includes a user's hearing thresholds at predetermined frequencies. In further embodiments of the invention, the gain applied controls the output of the output transducer. In further embodiments of the invention, the output transducer is adapted to vibrate the tympanic membrane of the user.

In embodiments of the invention, a method of transmitting vibrations to a tympanic membrane of a user may include the steps of: transmitting a first signal from a lateral ear canal assembly to a medial ear canal assembly, wherein at least a portion of the first signal comprises data which is generated from the hearing characteristics of the user wearing the medial ear canal assembly; storing the characteristic data on the medial ear canal assembly; transmitting a second signal from the lateral ear canal assembly to the medial ear canal assembly, wherein at least a portion of the second signal comprises data which is indicative of sounds in the proximity of the user; using the data which is generated from the hearing characteristics of the user to control amplification circuitry located on the medial ear canal assembly, wherein the amplification circuitry is adapted to amplify a signal derived from the data indicative of sounds in the proximity of the user's ear and the amplification circuitry is adapted to drive a microactuator attached to the medial ear canal assembly and in contact with the user's tympanic membrane. In embodiments of the invention, a method may further include a system wherein the amount of amplification applied a given frequency is proportional to the amplification required by the user at that frequency.

In embodiments of the invention, a smartlens system may include a lateral ear canal assembly and a medial ear canal assembly, the medial ear canal assembly may include: sensors adapted to sense parameters related to the status of components of the medial ear canal assembly; a transceiver positioned on the medial ear canal assembly and adapted to receive a signal which includes a power component and a data component; power control circuitry connected to the transceiver, the power control circuitry being adapted to harvest energy from signals received by the medial ear canal assembly; data control circuitry connected to the transceiver and adapted to manage data in the signals received by the medial ear canal assembly; sensor control circuitry for managing data from the sensors on the medial ear canal assembly; and control circuitry for driving an output transducer positioned on the medial ear canal assembly. In further embodiments of the invention, the data control circuitry includes circuitry adapted to manage sound data in the data in the signals received by the medial ear canal assembly. In further embodiments of the invention, the transceiver control circuitry is adapted to transmit data from the sensor control circuitry to the lateral ear canal assembly. In further embodiments of the invention, the lateral ear canal assembly is adapted to relay data from the medial ear canal assembly to a remotely located device. In further embodiments of the invention, the remotely located device is a cell phone. In further embodiments of the invention, the remotely located device is a computer. In further embodiments of the invention, the sensors on the medial ear canal assembly provide data on the output transducer. In further embodiments of the invention, the data provided is data related to the back EMF of the output transducer. In further embodiments of the invention, the data managed by the data control circuitry is data related to the physical characteristics of the person wearing the smartlens.

In embodiments of the invention, a smartlens system may include: a lateral ear canal assembly comprising a first transceiver including a first coil; a medial ear canal assembly comprising a second transceiver including a second coil, wherein the first coil is adapted to inductively couple to the second coil; a vibratory load connected to the second coil and adapted to vibrate in response to signals transmitted from the first coil to the second coil through inductive coupling; and a rectifying circuit connected between an output of the second coil and the vibratory load. In further embodiments of the invention, the smartlens transmits a signal having a push-pull format. In further embodiments of the invention, the smartlens transmits a signal having a zero crossing. In further embodiments of the invention, the coil is manufactured from conductive material. In further embodiments of the invention, the first and second coils are elongated coils. In further embodiments of the invention, the medial ear canal assembly includes a current sensor adapted to measure the current in the second coil. In further embodiments of the invention, the medial ear canal assembly includes a voltage sensor adapted to measure the voltage across the second coil. In further embodiments of the invention, the medal ear canal assembly includes power control circuitry connected between the second coil and the vibratory load. In further embodiments of the invention, the power control circuitry is further connected to an energy storage device. In further embodiments of the invention, the energy storage device is a capacitor. In further embodiments of the invention, the energy storage device is a rechargeable battery. In further embodiments of the invention, the transmission path between the first coil and the second coil comprises air. In further embodiments of the invention, the transmission path comprises a line of sight transmission path. In further embodiments of the invention, the transmission path comprises air in the ear canal of a user. In further embodiments of the invention, the lateral ear canal assembly is separated from the medial ear canal assembly by air in the ear canal of a user. In further embodiments of the invention, the first and second coils are stacked coils. In further embodiments of the invention, the first and second coils comprise wound inductors. In further embodiments of the invention, the first coil is wound around a first core and the second coil is wound around a second core. In further embodiments of the invention, the first core comprises air. In further embodiments of the invention, the first core has a substantially fixed diameter along at least a portion of the length of the first coil. In further embodiments of the invention, the second core comprises air. In further embodiments of the invention, the second core has a substantially fixed diameter along at least a portion of the length of the second coil. In further embodiments of the invention, the vibratory load is a transducer. In further embodiments of the invention, the transducer is a balanced armature transducer.

In embodiments of the invention, a method of transmitting data from a lateral ear canal assembly to a medial ear canal assembly is described, the method including: modulating the data; exciting a first coil on the lateral ear canal with the modulated data such that the coil generates a magnetic field; receiving the generated magnetic field at the medial ear canal assembly and generating a received signal representative of the modulated signal; and demodulating the received signal to generate a demodulated signal; using the demodulated signal to generate a drive signal; and using the drive signal to drive a microactuator positioned on the medial ear canal assembly. In further embodiments of the invention, the method may further include a step wherein the received signal comprises an electrical current which is induced in a coil by the magnetic field and wherein the coil is positioned on the medial ear canal assembly. In further embodiments of the invention, the method may further include a step wherein the received signal comprises an electrical voltage induced across at least one coil by the magnetic field and wherein the coil is positioned on the medial ear canal assembly.

In embodiments of the invention, a method of transmitting data from a lateral ear canal assembly to a medial ear canal assembly is described, the method including: exciting a first coil on the lateral ear canal assembly to generate a magnetic field; receiving at least a portion of the generated magnetic field at a second coil positioned on the medial ear canal assembly, wherein the received magnetic field induces a received signal in the second coil; rectifying the output of the second coil; and transmitting at least a portion of the rectified output to a load positioned on the medial ear canal assembly. In further embodiments of the invention, the method may further include a step wherein the load comprises a vibratory element adapted to vibrate in response to the rectified output. In further embodiments of the invention, the method may further include a step wherein the load comprises a balanced armature transducer. In further embodiments of the invention, the method may further include a step wherein the received signal comprises a voltage induced across the second coil. In further embodiments of the invention, the method may further include a step wherein the received signal comprises a current induced in the second coil. In further embodiments of the invention, the method may further include a step wherein first coil is excited with a signal having a push/pull format. In further embodiments of the invention, the method may further include a step wherein the first coil is excited with a signal having a zero crossing. In further embodiments of the invention, the method may further include a step wherein the first coil generates magnetic flux and the first coil is coupled to the second coil by the magnetic flux. In further embodiments of the invention, the method may further include a step wherein the received signal comprises a data portion. In further embodiments of the invention, the method may further include a step wherein the received signal further comprises an energy portion. In further embodiments of the invention, the method may further include a step wherein at least a portion of the energy in the received signal is used to charge an energy storage device. In further embodiments of the invention, the method may further include a step wherein at least a portion of the received signal provides data to the medial ear canal assembly. In further embodiments of the invention, the method may further include a step wherein the medium between the lateral ear canal assembly and the medial ear canal assembly comprises air. In further embodiments of the invention, the method may further include a step wherein the medium between the lateral ear canal assembly and the medial ear canal assembly comprises air in the ear canal of a user. In further embodiments of the invention, the method may further include a step wherein the magnetic field travels between the first and second coil through air. In further embodiments of the invention, the method may further include a step wherein the air between the first and second coil comprises air in the ear canal of the user. In further embodiments of the invention, the method may further include a step wherein the medial ear canal assembly is optically visible from the lateral ear canal assembly. In further embodiments of the invention, the method may further include a step wherein the only material between the medial ear canal assembly and the lateral ear canal assembly is air in the ear canal of a user.

In an embodiment of the invention, a smartlens system may include: a lateral ear canal assembly comprising a first transceiver including a first antenna; a medial ear canal assembly comprising a second transceiver including a second antenna, wherein the first antenna is adapted to couple to the second antenna using radio frequency communications. In further embodiments of the invention, the smartlens transmits a signal having a push-pull format. In further embodiments of the invention, the smartlens transmits a signal having a zero crossing.

In an embodiment of the invention, a smartlens system, may include a lateral ear canal assembly and a medial ear canal assembly, the medial ear canal assembly may include: sensors adapted to sense parameters related to the status of components of the medial ear canal assembly; a transceiver adapted to receive a signal which includes a power component and a data component; power control circuitry connected to the transceiver adapted to harvest energy from signals received by the medial ear canal assembly; data control circuitry connected to the transceiver and adapted to manage data in the signals received by the medial ear canal assembly; sensor control circuitry for managing data from the sensors on the medial ear canal assembly; and control circuitry for driving an output transducer positioned on the medial ear canal assembly. In further embodiments of the invention, the transceiver communicates using one or more of radio frequency, optical, inductive and cutaneous transmission of the data and power.

In an embodiment of the invention, a method of transmitting data and power from a lateral ear canal assembly to a medial ear canal assembly, the method including the steps of: encoding the data to be transmitted into a signal; driving a first coil positioned on the lateral ear canal assembly using encoded data; driving a second coil positioned on the medial ear canal assembly by inductively coupling the first coil to the second coil.

In an embodiment of the invention, a method of transmitting data and power from a lateral ear canal assembly to a medial ear canal assembly is described, the method including the steps of: encoding the data to be transmitted into a signal; driving a first antenna positioned on the lateral ear canal assembly using encoded data; driving a second antenna positioned on the medial ear canal assembly by inductively coupling the first coil to the second coil.

In an embodiment of the invention, a method of transmitting data and power from a lateral ear canal assembly to a medial ear canal assembly is described, the method including the steps of: encoding the data to be transmitted into a signal; driving an optical transmitter positioned on the lateral ear canal assembly using encoded data; driving an optical receiver positioned on the medial ear canal assembly by inductively coupling the first coil to the second coil. In further embodiments of the invention, the method may further include a step wherein the optical transmitter comprises a laser. In further embodiments of the invention, the method may further include a step wherein the optical receiver comprises a photodiode.

In embodiments of the invention, a method of providing energy to circuitry on a medial ear canal assembly is described, the method including the steps of: radiating a signal from a lateral ear canal assembly to the medial ear canal assembly; receiving the radiated signal at the medial ear canal assembly wherein the received signal includes a data component and a power component; detecting the data in the detected signal; harvesting the power in the detected signal; and storing the harvested power on the medial ear canal assembly. In further embodiments of the invention, the method may further include a step wherein the method including the step driving a microactuator using the detected data and the stored power.

In embodiments of the invention, a method of providing energy to circuitry on a medial ear canal assembly is described, the method including the steps of: harvesting Wi-Fi energy at a lateral ear canal assembly; using the harvested Wi-Fi energy to power the lateral ear canal assembly; radiating a signal from the lateral ear canal assembly to the medial ear canal assembly; receiving the radiated signal at the medial ear canal assembly wherein the received signal includes a data component and a power component; detecting the data in the detected signal; harvesting the power in the detected signal; and storing the harvested power on the medial ear canal assembly. In further embodiments of the invention, the method may further include a step including driving a microactuator using the detected data and the stored power.

In embodiments of the invention, where the data and power is transmitted optically, such sensors may further be used for automatically calibrating the light tip to the individual lens. This calibration may be accomplished by providing feedback on the output level from the photodetector to the light tip and comparing that output level to the drive level for the laser on the light tip. In embodiments of the invention, light calibration or other calibration of the hearing aid to the unique requirements of the hearing aid user is accomplished using data collected from the medial ear canal assembly.

In embodiments of the invention, the invention includes a method of inducing a detectable voltage in an electronic component positioned on or attached to a medial ear canal assembly. In embodiments of the invention, the invention includes a method of inducing a detectable current in an electronic component positioned on or attached to a medial ear canal assembly. In embodiments of the invention, the electronic component may be a coil. In embodiments of the invention, at least a portion of the power in a signal received by a medial ear canal assembly may be used to provide power to components on the ear canal assembly. In embodiments of the invention, at least a portion of the energy in a signal received by a medial ear canal assembly may be used to provide power to components on the ear canal assembly. In embodiments of the invention, at least a portion of the power in a signal received by a medial ear canal assembly may be stored on the medial ear canal assembly and thereafter used to provide power to components on the ear canal assembly. In embodiments of the invention, at least a portion of the energy in a signal received by a medial ear canal assembly may be stored on the medial ear canal assembly and thereafter used to provide power to components on the ear canal assembly. In an embodiment of the invention, a signal received at a medial ear canal assembly may include both data and power. In an embodiment of the invention, a signal received at a medial ear canal assembly may include both data and energy.

While the preferred embodiments of the devices and methods have been described in reference to the environment in which they were developed, they are merely illustrative of the principles of the present inventive concepts. Modification or combinations of the above-described assemblies, other embodiments, configurations, and methods for carrying out the invention, and variations of aspects of the invention that are obvious to those of skill in the art are intended to be within the scope of the claims. In addition, where this application has listed the steps of a method or procedure in a specific order, it may be possible, or even expedient in certain circumstances, to change the order in which some steps are performed, and it is intended that the particular steps of the method or procedure claim set forth herein below not be construed as being order-specific unless such order specificity is expressly stated in the claim.

REFERENCE NUMBERS

| Number | Element |
| --- | --- |
| 12 | Lateral Ear Canal Assembly |
| 20 | Transducer Assembly |
| 30 | Smartlens System |

-continued

| Number | Element |
|---|---|
| 100 | Medial Ear Canal Assembly |
| 150 | Photodetector |
| 152 | Current Source |
| 510 | Hybrid Circuit |
| 520 | Smart Chip |
| 540 | Antenna |
| 550 | Matching Network |
| 560 | Current Regulator |
| 570 | Driver |
| 580 | Data Decoder |
| 590 | Voltage Reference Circuit |
| 600 | Current Bias Circuit |
| 610 | Diagnostic Circuits |
| 620 | Current Driver |
| 640 | Clock |
| 650 | Energy Harvesting Circuit |
| 660 | Capacitor |
| 700 | Upstream Signal |
| 702 | Upstream Data |
| 710 | Downstream Signal |
| 712 | Downstream Data |
| 720 | Interface |
| 730 | Clock Recovery Circuit |
| 740 | Data Recovery Circuit |
| 750 | Energy Harvesting Circuit |
| 760 | Power management Circuit |
| 770 | Voltage Regulator |
| 780 | Driver |
| 790 | Data Processor Encoder |
| 800 | Data/Sensor Interface |
| 802 | External Antenna |
| 804 | Bluetooth Circuit |
| 806 | Battery |
| 808 | Power Conversion Circuit |
| 810 | Microphones |
| 812 | Charging Antenna |
| 814 | Wireless Charging Circuit |
| 816 | Interface Circuit |
| 818 | Power/Data Link |
| 820 | Pre-Amplifiers |
| 822 | Interface Circuit |
| 823 | Biological Sensors |
| 824 | Energy Harvesting and Data Recovery Circuit |
| 826 | Energy Storage Circuitry |
| 828 | Power Management Circuitry |
| 830 | A to D Converters |
| 831 | Matching Network |
| 832 | Data/Signal Processing Circuitry |
| 834 | Microcontroler |
| 836 | Driver |
| 838 | Microactuator |
| 840 | Digital Signal Processors |
| 842 | Cloud Based Computer |
| 844 | Cell Phone |
| 846 | Data Acquisition Circuit |
| 848 | MPPT Control Circuit |
| 850 | Pulse Density Modulator |
| 852 | Current Sensor |
| 853 | Parasitic Diode |
| 854 | Capacitor |
| 856 | Switch |
| 857 | Converter |
| 858 | Coil |
| 860 | RF Modulator |
| 862 | Coil |
| 863 | Voltage Meter |
| 864 | Laser |
| 865 | Rectifier and Converter Circuit |
| 868 | Storage Circuit |
| 870 | Power Amplifier |
| 872 | Parasitic Capacitance |
| 880 | Antenna |
| 882 | Load |
| 890 | Antenna |
| 900 | Monitor |
| 910 | Power Regulator |
| 920 | RF Demodulator |
| 930 | Driver |
| 940 | Actuator |
| 960 | Umbo Lens |
| 970 | FET Transistors |
| 972 | Capacitor |
| 974 | Diode |
| 976 | Input Circuit |
| 978 | Output Circuit |

What is claimed is:

1. A smartlens system comprising:
a lateral ear canal assembly comprising a first transceiver including a first coil;
a medial ear canal assembly comprising a second transceiver including a second coil, wherein the first coil is adapted to inductively couple to the second coil;
a vibratory load connected to the second coil and adapted to vibrate in response to signals transmitted from the first coil to the second coil through inductive coupling, the vibratory load comprising a balanced armature transducer wherein the balanced armature transducer comprises a winding; and
a rectifying circuit connected between an output of the second coil and the vibratory load wherein the rectifying circuit comprises:
a diode having an input and an output, wherein the input is connected to the output of the second coil and the output is connected to the winding; and
a capacitor connected between the output of the diode and the second coil.

2. A smartlens system according to claim 1, wherein the smartlens transmits a signal having a push-pull format.

3. A smartlens system according to claim 1, wherein the smartlens transmits a signal having a zero crossing.

4. A smartlens system according to claim 1, wherein the first and second coils are manufactured from conductive material.

5. A smartlens system according to claim 1 wherein the first and second coils are elongated coils.

6. A smartlens system according to claim 1 wherein the medial ear canal assembly includes a current sensor adapted to measure the current in the second coil.

7. A smartlens system according to claim 1 wherein the medial ear canal assembly includes a voltage sensor adapted to measure the voltage across the second coil.

8. A smartlens system according to claim 1 wherein the medal ear canal assembly includes power control circuitry connected between the second coil and the vibratory load.

9. A smartlens system according to claim 8 wherein the power control circuitry is further connected to an energy storage device.

10. A smartlens system according to claim 9 wherein the energy storage device is a capacitor.

11. A smartlens system according to claim 9 wherein the energy storage device is a rechargeable battery.

12. A smartlens system according to claim 1 wherein a transmission path between the first coil and the second coil comprises air.

13. A smartlens system according to claim 12 wherein the transmission path comprises a line of sight transmission path.

14. A smartlens system according to claim 12 wherein the transmission path comprises air in the ear canal of a user.

15. A smartlens system according to claim 1 wherein the lateral ear canal assembly is separated from the medial ear canal assembly by air in the ear canal of a user.

16. A smartlens system according to claim 1 wherein the first and second coils are stacked coils.

17. A smartlens according to claim 1 wherein the first and second coils comprise wound inductors.

18. A smartlens according to claim 1 wherein the first coil is wound around a first core and the second coil is wound around a second core.

19. A smartlens according to claim 18 wherein the first core comprises air.

20. A smartlens according to claim 19 wherein the first core has a substantially continuous diameter along at least a portion of the length of the first coil.

21. A smartlens according to claim 18 wherein the second core comprises air.

22. A smartlens according to claim 21 wherein the second core has a substantially continuous diameter along at least a portion of the length of the second coil.

23. A smartlens according to claim 1 wherein the vibratory load is a transducer.

24. A smartlens according to claim 23 wherein the transducer is a balanced armature transducer.

* * * * *